US012716864B1

(12) United States Patent
Rivnay et al.

(10) Patent No.: US 12,716,864 B1
(45) Date of Patent: Aug. 25, 2026

(54) ORGANIC ELECTROCHEMICAL TRANSISTOR AS AN ON-SITE SIGNAL AMPLIFIER FOR ELECTROCHEMICAL APTAMER-BASED SENSORS

(71) Applicant: Northwestern University, Evanston, IL (US)

(72) Inventors: Jonathan Rivnay, Evanston, IL (US); Xudong Ji, Evanston, IL (US)

(73) Assignee: Northwestern University, Evanston, IL (US)

( * ) Notice: Subject to any disclaimer, the term of this patent is extended or adjusted under 35 U.S.C. 154(b) by 168 days.

(21) Appl. No.: 18/842,298

(22) PCT Filed: May 9, 2023

(86) PCT No.: PCT/US2023/021537
§ 371 (c)(1),
(2) Date: Aug. 28, 2024

(87) PCT Pub. No.: WO2023/220056
PCT Pub. Date: Nov. 16, 2023

Related U.S. Application Data

(60) Provisional application No. 63/340,359, filed on May 10, 2022.

(51) Int. Cl.
*G01N 27/414* (2006.01)
*G01N 27/327* (2006.01)
*G01N 27/48* (2006.01)

(52) U.S. Cl.
CPC ..... *G01N 27/4145* (2013.01); *G01N 27/3276* (2013.01); *G01N 27/3277* (2013.01); *G01N 27/48* (2013.01)

(58) Field of Classification Search
CPC .......... G01N 27/4145; G01N 27/3276; G01N 27/3277; G01N 27/48
See application file for complete search history.

(56) References Cited

U.S. PATENT DOCUMENTS

2002/0006617 A1 1/2002 Fan et al.
2007/0020641 A1 1/2007 Heeger et al.
2019/0310225 A1 10/2019 Zhang

FOREIGN PATENT DOCUMENTS

WO WO 2021/063993 A1 4/2021

OTHER PUBLICATIONS

The International Search Report and the Written Opinion issued on Aug. 10, 2023 for international patent application No. PCT/US2023/021537; pp. 1-9.

(Continued)

*Primary Examiner* — Alexander S Noguerola
(74) *Attorney, Agent, or Firm* — Bell & Manning, LLC

(57) ABSTRACT

Analyte sensing devices that include an electrochemical aptamer-based (E-AB) sensor integrated with an organic electrochemical transistor (OECT) for signal amplification are provided. The E-AB sensor has a three-electrode setup that includes an aptamer-functionalized working electrode, an independent reference electrode, and a counter electrode composed of a mixed ionic-electronic conductive polymer. In the sensors, the working electrode simultaneously serves as a gate electrode for an OECT, while the mixed ionic-electronic conductive polymer also acts as the transistor channel of the OECT. This integrated device design retains the features of both the E-AB sensor and the OECT, thereby enabling electrochemical measurements to be carried out by the E-AB sensor, while simultaneously monitoring changes in the in-plane conductivity of the OECT channel.

20 Claims, 19 Drawing Sheets

Ref-OECT-Based E-AB Sensor

(56) References Cited

OTHER PUBLICATIONS

Qing Zhou et al., "Liver injury-on-a-chip: microfluidic co-cultures with integrated biosensors for monitoring liver cell signaling during injury†," *Lab Chip*, 2015, 15, 4467-4478.
Liang, Yuanying, et al. "Amplification of aptamer sensor signals by four orders of magnitude via interdigitated organic electrochemical transistors." *Biosensors and bioelectronics* 144 (2019): 111668.
Saraf, Nileshi, et al. "Highly selective aptamer based organic electrochemical biosensor with pico-level detection." *Biosensors and Bioelectronics* 117 (2018): 40-46.
Ji, Xudong, Xuanyi Lin, and Jonathan Rivnay. "Organic electrochemical transistors as on-site signal amplifiers for electrochemical aptamer-based sensing." *Nature communications* 14.1 (2023): 1665.
Ji, Xudong, Xuanyi Lin, and Jonathan Rivnay. Preprint: "Organic electrochemical transistors as on-site signal amplifiers for electrochemical aptamer-based sensing," (Jul. 19, 2022); pp. 1-14. https://doi.org/10.1101/2022.07.18.500444.
Sophia L. Bidinger et al., "Pulsed transistor operation enables miniaturization of electrochemical aptamer-based sensors," *Science Advances* (Nov. 16, 2022), 8, eadd4111; pp. 1-5.
Yuanying Liang et al., "Label-Free Split Aptamer Sensor for Femtomolar Detection of Dopamine by Means of Flexible Organic Electrochemical Transistors," *Materials* 2020, 13, 2577; doi: 10.3390/ma13112577; pp. 1-13.
Matharu, Zimple, et al. "Detecting transforming growth factor-β release from liver cells using an aptasensor integrated with microfluidics." *Analytical chemistry* 86.17 (2014): 8865-8872.
Yixin Liu et al., "Recent progress on electrochemical (bio)sensors based on aptamer-molecularly imprinted polymer dual recognition," *Sensors and Actuators Reports* 4 (2022) 100112; pp. 1-12.
Samy M. Shaban et al., "Recent Advances in Aptamer Sensors," *Sensors* 2021, 21, 979; pp. 1-31. https://doi.org/10.3390/x21030979.

I: fabrication of on-chip Ag/AgCl
113
110
111
103
D
S
Ref
Gate
glass substrate
101
1
2
3
4
5
156
154
152
104
Ag
115
FeCl3
Ag/AgCl
photoresist
parylene
anti-adhesive
PEDOT:PSS

FIG. 2C

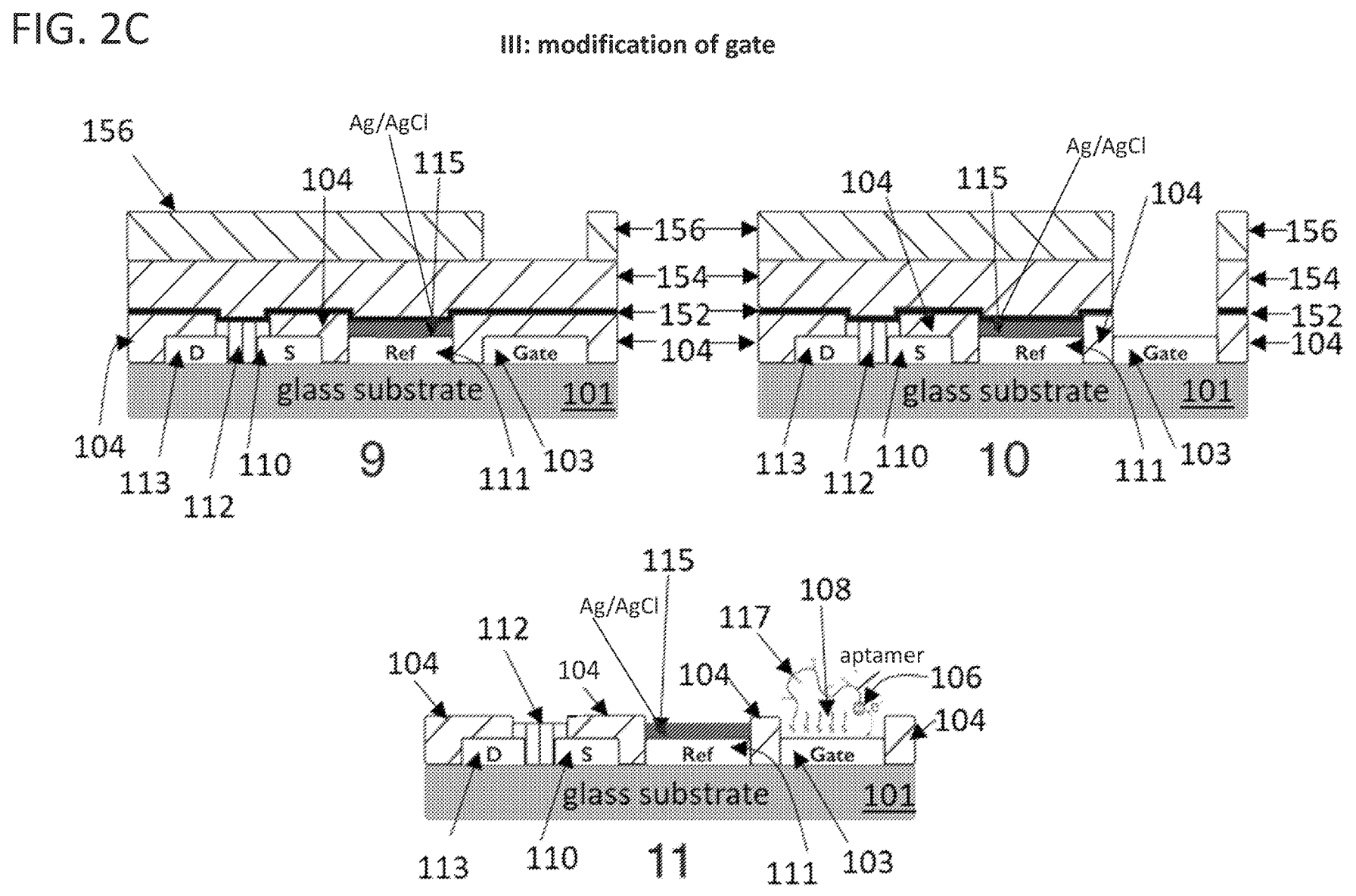

III: modification of gate

9 glass substrate

101

Gate

Ref

S

D

Ag/AgCl

10

11 aptamer 156 154 152 104 103 111 115 110 112 113 106 108 117

I (nA)
E (V vs Ag/AgCl)
25 mV/s
50 mV/s
100 mV/s
150 mV/s
reduction scan
oxidation scan IDS (mA)
Time (s)
25 mV/s
50 mV/s
100 mV/s
150 mV/s ∂IDS/∂t (mA/s)
Time (s)
25 mV/s
50 mV/s
100 mV/s
150 mV/s IDS (mA)
Vg,int (V)
25 mV/s
50 mV/s
100 mV/s
150 mV/s ∂IDS/∂Vg,int (mS)
Vg,int (V)
25 mV/s
50 mV/s
100 mV/s
150 mV/s

ORGANIC ELECTROCHEMICAL TRANSISTOR AS AN ON-SITE SIGNAL AMPLIFIER FOR ELECTROCHEMICAL APTAMER-BASED SENSORS

CROSS-REFERENCE TO RELATED APPLICATIONS

The present application is a National Stage of International Application No. PCT/US23/21537, filed May 9, 2023, which claims priority to U.S. provisional patent application No. 63/340,359 that was filed on May 10, 2022, the entire contents of both of which are incorporated herein by reference.

REFERENCE TO GOVERNMENT RIGHTS

This invention was made with government support under grant number AWD00001593 awarded by the Department of Defense. The government has certain rights in the invention.

BACKGROUND

A biosensor is a device that is used to detect the concentration of various biomarkers ranging from pH, ions and small molecule analytes (glucose, lactate) to nucleic acids, and even proteins and cells. It is usually composed by a bio-recognition element, a signal transducer, as well as the signal processing system in the backend. The bio-recognition element is the most important component in the biosensor that can enable it with sensitivity and selectivity. Different bio-recognition elements like ion-selective membrane (ISM), molecular imprinted polymer (MIP), enzyme, antibody, and aptamer have been used in a biosensor for sensing. Among those bio-recognition elements, aptamers have drawn a lot of attention owing to their ease of chemical synthesis, strong and multiple binding with specific analytes, wider applicability of different targets, good thermal/environment stability, fast-production, and low-cost. Electrochemical aptamer-based (E-AB) sensors based on a single modified electrode or array of electrodes have been used as standard structures in the research community of aptamer-based biosensors. The sensing ability is achieved by monitoring the change of electron transfer rate in the redox reporter/electrode interface that is altered by conformational changes of the aptamer induced by target binding. The aptamer is commonly modified with a thiol group on one end to bond with the electrode and a redox reporter on the other end. Signals are usually transduced using established electrochemical interrogation methods like chronoamperometry (CA), cyclic voltammetry (CV), square wave voltammetry (SWV), and electrochemical impedance spectroscopy (EIS). Hence, there is a trade-off between high sensitivity and device miniaturization. E-AB sensors have been successfully utilized in sensing various important biomarkers both in vitro and in vivo. However, the current change of redox peak from the redox reporter in those sensors is usually very small (~nA), especially when the surface area of the sensing electrode is reduced for the purpose of miniaturization. A small surface area limits the sensitivity of an E-AB sensor because the surface area of the electrode determines the number of aptamers that generate signal after binding to a target analyte, which limits its sensitivity.

One strategy to increase the sensitivity of an electrode-based E-AB sensor is to create an electrode with a high surface area through electrochemical alloying/dealloying, surface wrinkling, or electrochemical nanostructuring. However, the upper limit for the enhancement of the surface area and the sensitivity can only be improved dozens of times at most. Another strategy to enhance sensitivity is through amplification, typically by implementing a transistor. Among different types of transistors, organic electrochemical transistors (OECTs) have gained particular attention. An organic electrochemical transistor (OECT) is a three terminal device composed by a gate, a drain, and a source terminal. The drain and source terminals are linked by an ionic-electronic mixed conducting channel, whose conductivity can be altered by the ion injection/extraction controlled through the gate bias. Due to their ion-to-electron converting property, high transconductance, and biocompatibility, OECTs are attractive in the area of bioelectronics as biosensors to acquire high quality signals. (Liang, Y. et al., *Materials* 13, 2577 (2020); Liang, Y. et al., *Biosensors and bioelectronics* 144, 111668 (2019); Saraf, N., et al., *Biosensors and Bioelectronics* 117, 40-46 (2018).). Unlike frequently used biorecognition elements such as ion-selective membranes, enzymes, and antibodies, aptamers are rarely used in OECTs and very few studies have reported integrating OECTs with E-AB sensors. Those integrated devices can be used to sense ATP, dopamine, and epinephrine. While in those reported works, a similar device structure as other OECT-based enzymatic sensors has been used where an Au gate electrode (functioning as a working electrode) is modified with a redox reporter-modified aptamer and the shift of the transfer curve of OECT is considered as sensor output. In this traditional device architecture (referred to herein as a conv-OECT) and testing scheme, it is difficult for the OECT to capture the modulation of electron transfer kinetics of the redox reporter, which is altered by the structural modulation of the aptamer upon target binding. While operational, many aptamer-based OECT sensors' sensing mechanisms are likely due to small changes in impedance (most likely capacitive) in the ionic circuit between the gate and channel after target binding, which results in the shift of their transfer curve. As such, the typical sensing mechanism in E-AB sensors is not harnessed in previous OECT devices, limiting their generalizability. As a result, a redesigned device concept, architecture, and testing scheme is needed to integrate and characterize the OECT-based E-AB sensors. Such a device should fully utilize established sensing mechanisms while taking advantage of the on-site amplification properties of OECTs.

SUMMARY

Referenced-organic electrochemical transistor (OECT)-based electrochemical aptamer-based (E-AB) sensors are provided. One embodiment of an OECT-based E-AB sensor includes: (a) an E-AB sensor comprising: (i) a working electrode comprising a redox-reporter-modified aptamer-functionalized electrode; (ii) a reference electrode connected to the working electrode; (iii) a counter electrode comprising a layer of a mixed ionic-electronic conductive polymer; (iv) a voltage source for applying a voltage to the working electrode; and (v) a working-electrode-current-detector for measuring a Faradaic current in the working electrode; and (b) an OECT comprising: (i) a gate electrode comprising the redox-reporter-modified aptamer-functionalized electrode that is also the working electrode in the E-AB sensor; (ii) a source electrode; (iii) a drain electrode; (iv) a channel connecting the source electrode to the drain electrode, the channel comprising the layer of the mixed ionic-electronic conductive polymer that is also the counter electrode in the E-AB sensor; and (v) a channel-current-detector for measuring an in-plane current in the channel between the source electrode and the drain electrode.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIGS. 2A-2C show a method of fabricating thin form-factor ref-OECT-based E-AB in which a working electrode functionalized by a redox reporter-modified aptamer, a counter electrode, and an on-chip reference electrode are monolithically integrated in a same substrate. The method includes fabrication of an on-chip reference electrode (FIG. 2A, steps 1-5), patterning of a transistor channel (FIG. 2B, steps 6-8), and modification (functionalization) of a gate electrode with aptamer (FIG. 2C, steps 9-11).

FIG. 3A shows four scans of cyclic voltammetry (CV) of the E-AB sensor with a scan rate 60 mV/s and a step voltage 0.004 V. FIG. 3B shows the real-time voltage on the working electrode, the working electrode current/gate current, and the channel current of the OECT when performing the CV measurement in the E-AB sensor. Stable $I_{DS}$ modulation ($V_{DS}$=−0.2 V) was demonstrated during the four CV scans and the sudden change of Ips indicated by the circles owing to the high reduction/oxidation gate current from the MB redox reporter. FIG. 3C shows nine scans of square-wave voltammetry (SWV) of the E-AB sensor with a scan rate 60 Hz, a pulse amplitude 0.04 V, and a step voltage 0.004 V. FIG. 3D shows the real-time voltage on the working electrode (staircase pattern not shown for clarity), the working electrode current/gate current, and the channel current of the OECT when performing SWV measurements in the E-AB sensor. Stable Ips modulation ($V_{DS}$=−0.2 V) is demonstrated during the nine SWV scans and the sudden change of/Ds indicated by the circle owing to the high reduction gate current from the MB redox reporter.

FIG. 4A shows a testing scheme of the conv-OECT-based E-AB sensor. FIGS. 4B-4C show a comparison of the channel current and slope of the channel current between the ref-OECT and conv-OECT-based E-AB sensors. The scan speed was 60 mV/s for both devices and $V_{DS}$ was −0.2 V. The maximum slope of the channel current was much higher in the ref-OECT than that of the conv-OECT-based E-AB sensor. $V_{g,int}$ describes the voltage drop at the gate/electrolyte interface.

FIGS. 5A, 5D show a series of CV and SWV voltammograms taken by the E-AB sensor with different concentrations of TGF-$\beta_1$. Decreased redox peak was induced by increasing the concentration of TGF-$\beta_1$. FIGS. 5B, 5E show a series of channel current modulations in the ref-OECT with different concentrations of TGF-$\beta_1$ when performing the CV/SWV measurement with the E-AB sensor. Decreased channel current modulation was induced by increasing the concentration of TGF-$\beta_1$. FIGS. 5C, 5F show calibration curves of TGF-$\beta_1$ sensing based on bare E-AB sensors and ref-OECT-based E-AB sensors (error bars represent standard deviation, N=3). The ref-OECT-based E-AB sensor shows ~12000-fold enhancement in sensitivity (290 μA/dec) over CV sensing (24 nA/dec) and ~3500-fold enhancement in sensitivity (292 μA/dec) over SWV sensing (84 nA/dec) in the bare E-AB sensor, with a similar detection limit (~1 ng/ml). The $\Delta I_{DS}$ of the ref-OECT-based E-AB sensor was extracted at $V_{g,int}$ equal to −0.4 V. The sensitivity was derived from a linear fitting when the concentration of TGF-$\beta_1$ was larger than 10 ng/mL. The 3 σ region was defined by the 3-fold of the standard deviation when performing the CV, SWV, and the ref-OECT measurement in bare 1×PBS solution 10 times.

FIG. 7A. Voltage waveform of CV measurement (voltage is ramped up stepwise instead of true linear). FIGS. 7B and 7C (enlarged). Raw data and smoothed data of the channel current in ref-OECT-based E-AB sensor during CV-OECT operation. FIG. 7D. Voltage waveform of an SWV measurement. FIGS. 7E and 7F (enlarged). Raw data and sampled data of the channel current in a ref-OECT-based E-AB sensor during SWV-OECT operation.

FIGS. 8A and 8D show CV and SWV results for an aptamer modified Au working electrode in a bare 1× phosphate buffered saline (PBS) buffer solution with different $V_{DS}$. FIGS. 8B and 8E show the channel current for a ref-OECT-based E-AB sensor in CV-OECT or SWV-OECT operation with different $V_{DS}$. FIGS. 8C and 8F show the slope of the channel current of a ref-OECT-based E-AB sensor in CV-OECT or SWV-OECT operation with different $V_{DS}$.

FIG. 9A. Influence of scan rate for CV on the reduction and oxidation peaks for a MB redox reporter in an aptamer-modified Au working electrode. FIGS. 9B and 9C. Channel current (FIG. 9B) and slope of channel current (FIG. 9C) for a ref-OECT-based E-AB sensor with different scan rates when plotted as a function of time. FIGS. 9D and 9E. Channel current (FIG. 9D) and slope of channel current (FIG. 9E) for a ref-OECT-based E-AB sensor with different scan rate when plotted with respect to $V_{g,int}$. Only the channel current during reduction scan of MB redox reporter is shown.

DETAILED DESCRIPTION

Analyte sensing devices that include an E-AB sensor with OECT signal amplification are provided. The E-AB sensor has a three-electrode setup that includes an aptamer-functionalized working electrode, an independent reference electrode, and a counter electrode composed of a mixed ionic-electronic conductive polymer. In the sensors, the working electrode simultaneously serves as the gate electrode for an OECT, while the mixed ionic-electronic conductive polymer also acts as the channel of the OECT. This integrated device design retains the features of both the E-AB sensor and the OECT, thereby enabling electrochemical measurements, such as cyclic voltammetry (CV) and square-wave voltammetry (SWV) to be carried out by the E-AB sensor, while simultaneously monitoring changes in the in-plane conductivity of the OECT channel (E-AB counter electrode).

Because the devices use an independent reference electrode in the three-electrode setup of the E-AB sensor, the devices are referred to herein as ref-OECT-based E-AB sensors. The direct amplification of the current from the E-AB sensor as in-plane current modulation in the OECT channel makes the ref-OECT-based E-AB sensors more sensitive than conventional E-AB sensors. In addition, since the channel conductivity is measured as an output of the ref-OECT-based E-AB sensors, said sensors are distinguishable from, and more sensitive than, known OECT-based E-AB sensors in which the shift in the transfer curve of the OECT is the output.

The various components of the ref-OECT-based E-AB sensor, including the reference electrode, can be monolithically integrated in a thin film form-factor (e.g., via on-chip integration). This compact design facilitates device miniaturization, the fabrication of compact, high-density ref-OECT-based E-AB sensor arrays for use in the in vitro and in vivo high throughput diagnostics for trace amounts of analytes, and integration into larger electronic systems. Monolithic integration can be carried out using multiple photolithography, vapor phase deposition, and etching processes, as illustrated in the Example below.

Figure 1A:
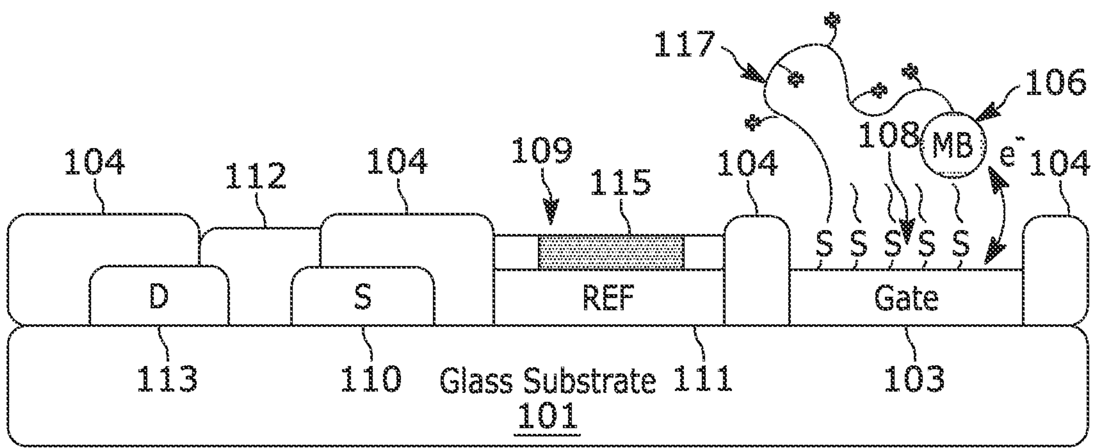
FIG. 1A shows a cross-sectional view (upper panel) and an exploded view (lower panel) of a ref-OECT-based E-AB sensor.
Figure 1A:
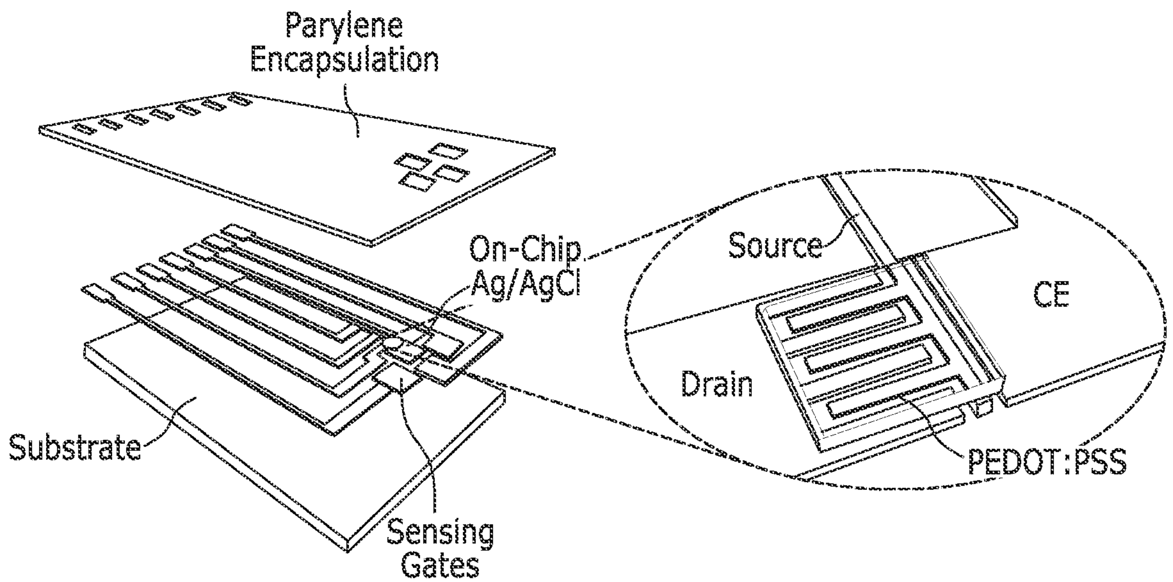

Schematic diagrams of one embodiment of a ref-OECT-based E-AB sensor having a thin form-factor and including an on-chip reference electrode are shown in a cross-sectional view and an exploded view in FIG. 1A, upper and lower panels, respectively. The ref-OECT-based E-AB sensor includes a substrate 101. Substrate 101 may be a rigid substrate, like glass or Si, or a flexible substrate, like SU-8 or parylene. On top of substrate 101, a set of electrodes 103, 110, 113, and 109 are formed. These electrodes serve as the E-AB working electrode/OECT gate electrode 103, OECT source and drain electrodes 110, 113, and reference electrode 109 for the E-AB sensor. Working/gate electrode 103 is functionalized with an aptamer 117, as discussed in greater detail below. Electrodes 103, 110, 113, and 109 may be electrically isolated by a dielectric material 104, such as a layer of parylene, polyimide poly(vinylidene fluoride) (PVDF), or polyimide (Kapton), or an inorganic dielectric, such as a metal oxide, that encapsulates the electrodes, except for their functional surfaces. In the embodiment of the ref-OECT-based E-AB sensor of FIG. 1A, on-chip reference electrode 109 and working/gate electrode 103 are fabricated in the same layer of the device. For the OECT device, drain electrode 113 is connected to source electrode 110 by a layer of mixed ionic-electronic conductive polymer 112 that acts as both the transistor channel of the OECT and the counter electrode of the E-AB sensor.

As illustrated in the enlarged view in FIG. 1A, bottom panel, the source and drain electrodes may be interdigitated and patterned underneath the electrically conductive channel/counter electrode to define a large W/L and boost the channel current modulation. Optionally, a separate electrode (i.e., an electrode other than the drain or source electrode) can serve as a connection lead for the counter electrode/channel). However, it should be noted that it is also possible to further simplify the structure of the ref-OECT-based E-AB sensor by using the same electrically conductive contact as both the source electrode and a contact for the counter electrode/channel.

The various electrodes in the device comprise electrically conductive materials, such as metals and metal alloys, and may be single-layered or multilayered electrodes. Reference electrode 109 may include an underlying electrically conductive contact 111. Gold (Au) and copper (Cu) are examples of suitable materials for working/gate electrode 103, source electrode 110, drain electrode 113, and contact 111. However, other metals and non-metal electrically conductive materials can be used. Ag/AgCl is a suitable reference electrode material. However, other reference electrode materials, such as a Calomel electrode, can be used. If an Ag/AgCl reference electrode is used, it can be formed by depositing and patterning a layer of Ag on an underlying contact, then applying an $FeCl_3$ solution on top of the Ag surface to turn the Ag partially into AgCl. Optionally, an adhesion layer, such as a chromium (Cr) or titanium (Ti) layer, can be deposited on substrate 101 prior to electrode fabrication to improve the adhesion of Au electrodes and contacts 103, 110, 113, and 111.

Figure 1B:
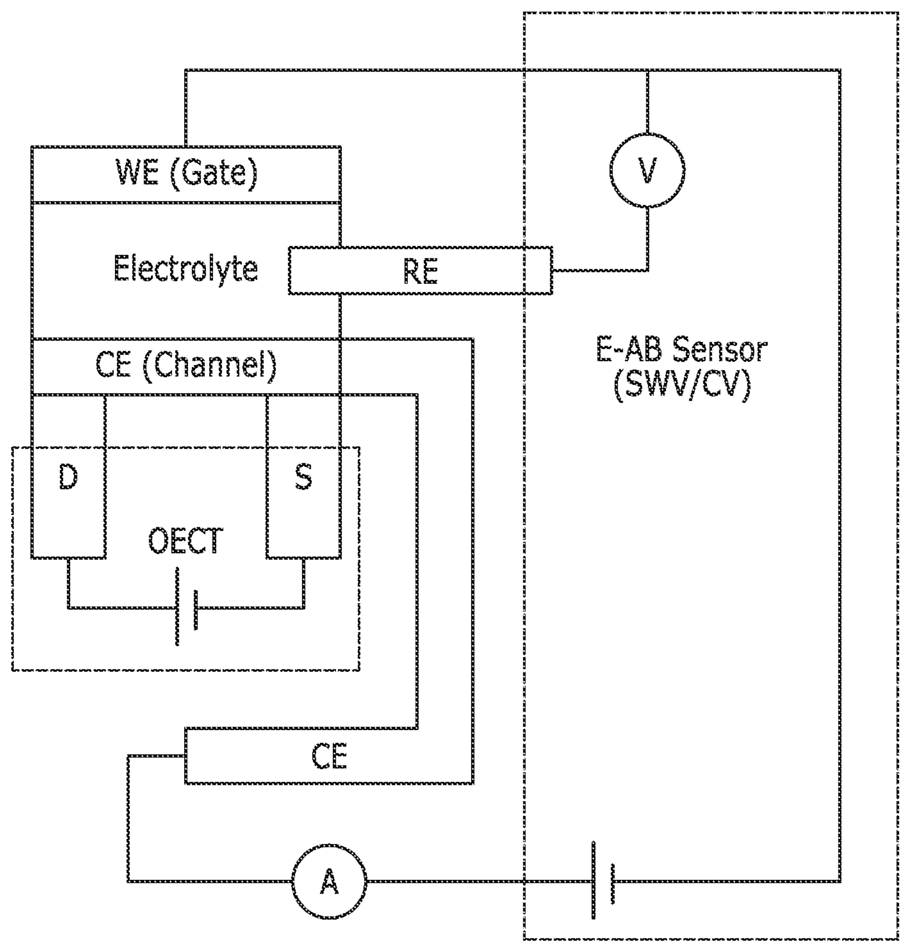
FIG. 1B shows a testing scheme of a ref-OECT-based E-AB sensor. Output of channel current in the OECT can be monitored during the operation of the E-AB sensor in a 3-electrode setup.

The ref-OECT-based E-AB sensors may include more than one aptamer-modified working electrode (gate electrode), as illustrated in the exploded view of the ref-OECT-based E-AB sensor shown in FIG. 1B, which includes three aptamer-modified electrodes.

The mixed ionic-electronic conductor that acts as both the E-AB sensor counter electrode and the OECT channel is a conjugated organic polymer that supports both electronic charge transport and ionic charge transport. An example of a mixed ionic-electronic conductor is poly(3,4-ethylenedioxythiophene) doped with poly(styrenesulfonate) (PEDOT:PSS).

Working/gate electrode 103 is functionalized with aptamers 107, which provide the ref-OECT-based E-AB sensors with sensing ability. The aptamers are single stranded oligonucleotides (e.g., DNA or RNA) or peptides that undergo a conformation change when they bind to specific target molecules (analytes) present in an electrolyte solution. The aptamers can be screened and isolated in-vitro by the systematic evolution of ligands by an exponential enrichment (SELEX) process. The aptamers are themselves modified with a functional group, such as a thiol, that binds the aptamer to working/gate electrode 103 and are also modified with a redox reporter. The redox reporters are chemical moieties that undergo charge transfer (e.g., electron transfer) with working/gate electrode 103 when the redox reporters are near said electrode. Non-limiting examples of redox reporters are methylene blue (MB) and ferrocenes. Optionally, a self-assembled monolayer (SAM) 108 may be applied to the surface of electrode 103 to confer biocompatibility, reduce unwanted non-specific binding, and/or reduce leakage current. By way of illustration only, working/gate electrodes can be functionalized with an aptamer by, for example, immersing an exposed surface of the electrode in a solution containing an aptamer that is pre-modified by a thiol group on its 3' end to bind with the electrode and a MB redox reporter 106 on its 5' end to serve as an indicator to interrogate electrode 103 via charge transfer kinetics. After aptamer modification, the electrode surface can be backfilled by mercaptohexanol (MCH) 108 to form a SAM and avoid unwanted leakage current through the Au electrode.

The testing scheme for a ref-OECT-based E-AB sensor is shown in FIG. 1B. The ref-OECT-based E-AB sensor operates simultaneously as both a traditional electrochemical sensor and an OECT. When conducting electrochemical sensing, aptamer functionalized electrode 103 is used as a working electrode, independent reference electrode 109 is used a reference point to set a precise voltage drop at the interface between working electrode 103 and an electrolyte solution, and layer of mixed ionic-electronic conductive polymer 112 is used as a counter electrode. Different electrochemical measurements, like CV and SWV, can be conducted based on this three-electrode system. When the electrochemical measurements are carried out with a three-electrode setup, the change in the in-plane conductivity in the counter electrode, which provides the electrically conductive channel of the OECT, is measured by monitoring the channel current from the source electrode to the drain electrode. Thus, as noted above, the working electrode and the counter electrode of the E-AB sensor operate simultaneously as the gate and channel of the OECT, respectively. Notably, since the characterization of the working electrode is done in a three-electrode system, the electrochemistry that happens at the working electrode is not influenced, even though it is integrated with an OECT. The variation of the in-plane conductivity of the transistor channel during CV or SWV operation can be regarded as the output of an OECT device, and this output can be directly related to the current in the working electrode (i.e., the gate current, $I_g$, from the perspective of the OECT).

Figure 1C:
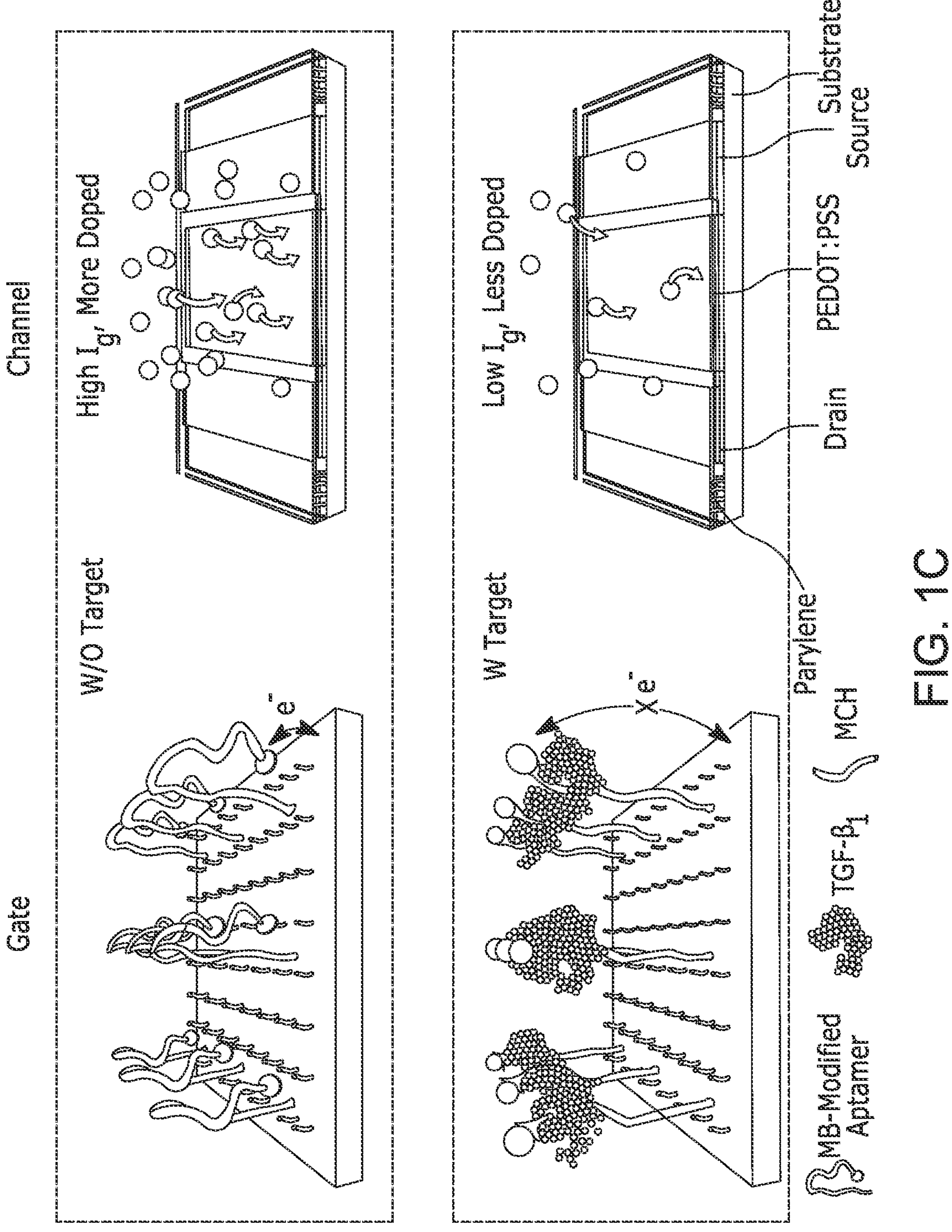
FIG. 1C shows a sensing mechanism of a ref-OECT-based E-AB sensor for TGF-$\beta_1$. Without the existence of TGF-$\beta_1$, a methylene blue (MB) redox reporter is closer to the gate electrode surface, which results in a high gate current ($I_G$), as well as a larger channel current modulation ($I_{DS}$). In the presence of TGF-$\beta_1$, a conformational change occurs in the aptamer, and the MB redox reporter moves further from the gate electrode surface, which results in low gate current and smaller channel current modulation.

The sensing mechanism for a ref-OECT-based E-AB sensor is shown in FIG. 1C. During sensor operation, the doping and de-doping of the mixed ionic-electronic conductive polymer modulates the doping level in the channel of the OECT and, therefore, its conductivity. This doping level modulation is controlled by the ionic current at the interface of the mixed ionic-electronic conductive polymer and an electrolyte solution that contains the analyte of interest. The conductivity changes of the counter electrode of the E-AB sensor (channel of the OECT) can be monitored as the in-plane conductivity of the channel between the source and the drain of the OECT. In this way, direct amplification of the current in the working electrode (gate, E-AB sensor) as the in-plane current modulation in the counter electrode (OECT channel) can be achieved.

The ref-OECT-based E-AB sensors can be used to detect a wide range of analytes that bind to the aptamers on the aptamer-functionalized working electrode. The analytes may be, for example, small molecules, peptides or proteins, enzymes, nucleotides, metal ions, and even whole cells. For purposes of illustration only, the protein TGF-$\beta_1$ is used as an analyte (also referred to as a target), Au is used as the material for the working electrode, the aptamer on the working electrode is an MB-modified aptamer, and the mixed ionic-electronic conductive polymer of the counter electrode/channel is PEDOT:PSS in FIG. 1C. As illustrated in FIG. 1C, upper left panel, without the TGF-$\beta_1$, the aptamer is in a conformation in which the MB (light colored sphere) is close to the Au working electrode surface, which results in a large current in the working electrode (large $I_g$) due to efficient electron transfer between the MB and the Au. The large $I_g$ will lead to an elevated doping level of the PEDOT:PSS (FIG. 1C, upper right panel) reflected by the large channel current modulation. In the case where the TGF-$\beta_1$ is present in the electrolyte solution, the binding between the aptamer and the TGF-$\beta_1$ causes a conformational change of the aptamer and brings the MB redox reporter away from the electrode surface (FIG. 1C, lower left panel), which results in a small current in the working electrode (small $I_g$) (FIG. 1C, lower right panel). This small $I_g$ will cause a relatively smaller enhancement of the doping level of the polymer channel and a smaller channel current modulation in the polymer channel. Under these circumstances, the degree of reduction in the channel current can be regarded as an indicator for the TGF-$\beta_1$ concentration in the integrated device. It should be understood, however, that in other embodiments of the ref-OECT-based E-AB sensors, the redox reporter may be relatively far from the surface of the working electrode in the absence of analyte binding, and the binding of the analyte to the aptamer brings the redox reporter closer to the working electrode. Under these circumstances, the degree of increase in the channel current can be regarded as an indicator for the target concentration in other integrated devices.

Electrochemical measurements carried out by the three-electrode system of the E-AB sensor include voltammetry measurements in which a time-varying potential (voltage versus the reference electrode) is applied to the working electrode, and the current in the working electrode is measured as a function of that potential to produce a voltammogram. Voltammetric techniques that can be carried out by the E-AB sensor include CV, SWV, and different pulse voltammetry (DPV). The characteristics of the peaks in the voltammograms, such as magnitude, width, and/or position, correlate with the concentration of aptamer-bound analyte in the electrolyte solution. For example, depending upon whether the analyte binding decreases or increases the distance between the working electrode (gate electrode) and the redox reporter, the magnitude of the peaks may decrease or increase with increasing analyte concentration. The oxidation and reduction of the redox reporter that gives rise to the peaks ("redox peaks") in the voltammogram also show up as modulations in the channel current of the integrated OECT and, in particular, as abrupt increases and decreases in channel current when the oxidation/reduction of the redox reporter occurs at the working electrode. The concentration of analyte in the electrolyte solution may be quantified by comparison to calibration curves that correlate the concentration of the analyte in an electrolyte solution with the redox (Faradaic) current of the voltammogram and the channel current change in the OECT.

Figure 2A:
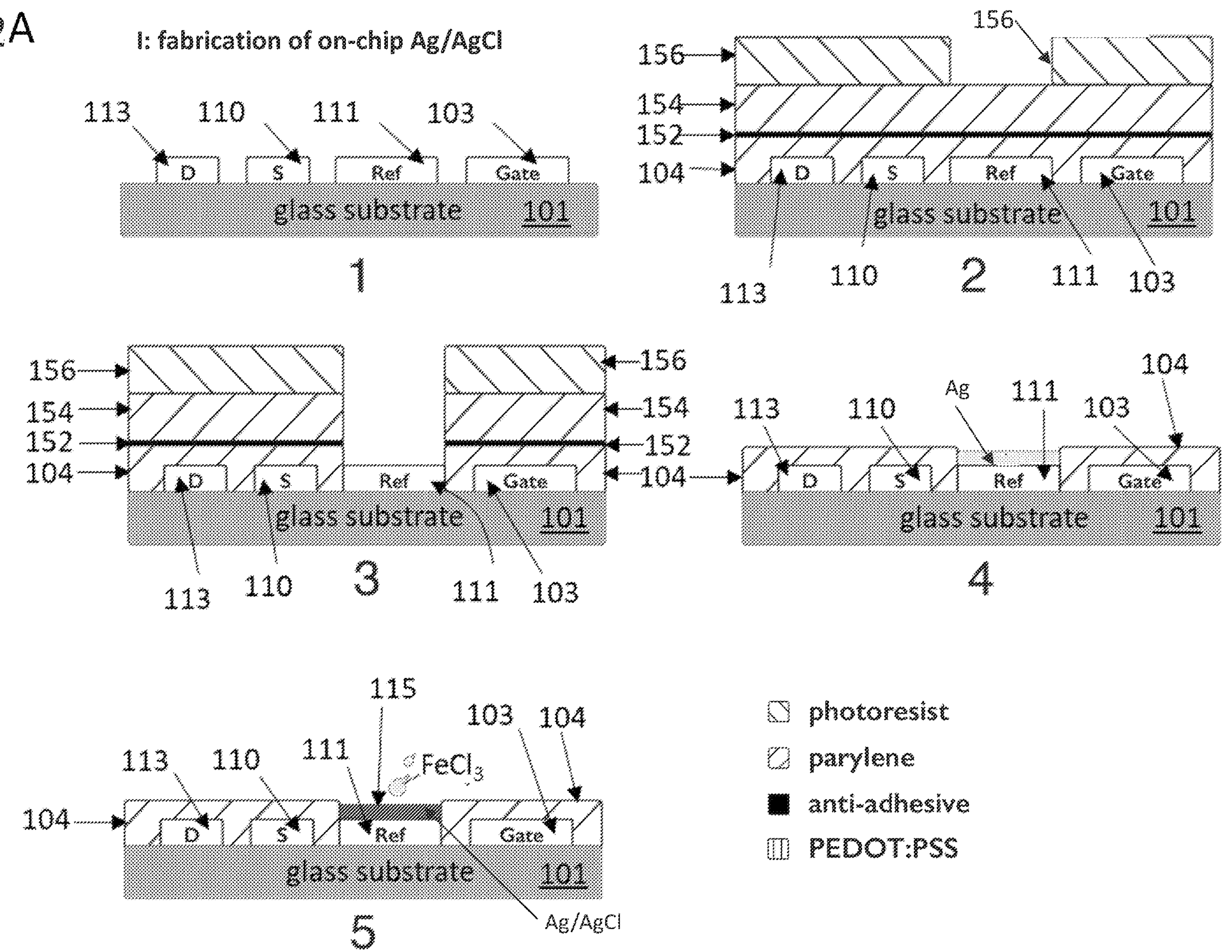

One method for fabricating a ref-OECT-based E-AB sensor is shown in FIGS. 2A (steps 1-5), 2B (steps 6-8), and 2C (steps 9-11). First, electrodes 103, 110, and 113 and contact 111 are patterned on substrate 101 using, for example, photolithography (step 1). Next, an electrically insulating material 104 serving as an encapsulation layer is deposited over the electrodes and contact. Then, an anti-adhesive layer 152 is deposited on electrically insulating material 104, followed by a second layer of electrically conductive material 154 (step 2). Anti-adhesive layer 152 defines the outlines of the device encapsulation layer in the finished device. Contact 111 is then exposed by, for example, photolithography using a photoresist 156 and reactive ion etching steps (step 3). Electrode 109 is then completed. For an Ag/AgCl reference electrode, a film of Ag is deposited (step 4) on underlying contact 111, followed by applying an $FeCl_3$ solution onto the Ag to partially transform the Ag to AgCl (step 5). After the fabrication of the on-chip Ag/AgCl electrode, the mixed ionic-electronic conductive polymer counter electrode (channel) is formed between drain and source electrodes 113 and 110 by exposing said electrodes via lithography using a photoresist (steps 6 and 7) and forming a layer of mixed ionic-electronic conductive polymer 112 between electrodes 110 and 113 (step 8). The last step of the device fabrication is the modification of electrode 103 (the working/gate electrode) with aptamer. The same deposition and etching process used previously can be used to expose electrode 103 (steps 9 and 10), while keeping the other parts of the device encapsulated. The device is then immersed in an aptamer-containing solution, whereby the aptamer reacts with and becomes bound to electrode 103, followed by the removal of any remaining anti-adhesive layer 152, second electrically insulating layer 154, and photoresist 156 (step 11).

EXAMPLE

This Example demonstrates a ref-OECT-based E-AB sensor made by monolithically integrating an aptamer-modified Au working/sensing electrode, an on-chip Ag/AgCl reference electrode and a poly(3,4-ethylenedioxythiophene)-poly (styrenesulfonate) (PEDOT:PSS) counter electrode into a substrate. This device retained the features of both the OECT and the E-AB sensor, providing the functionality of both. The operation of the E-AB sensor was based on a typical 3-electrode setup and ensured the applicability of established electroanalytical techniques like cyclic voltammetry (CV) and square-wave voltammetry (SWV), retaining the original sensing mechanism. The conductivity changes of the PEDOT:PSS counter electrode caused by a doping/de-doping process from the ionic current during the operation of the E-AB sensor can be monitored with two additional contact leads which provide the output of the OECT device. In this way, direct amplification of the current in the working electrode (gate, E-AB sensor) to the in-plane current modulation in the counter electrode (OECT channel) can be achieved. The ref-OECT-based E-AB sensor was used to sense transforming growth factor beta 1 (TGF-$\beta_1$), which is one of the most important biomarkers during wound healing, with 3~4 orders of magnitude enhancement in sensitivity (290 μA/dec for CV-ref-OECT, 292 μA/dec for SWV-ref-OECT) compared to a bare E-AB sensor (24 nA/dec for CV, 85 nA/dec for SWV), with a similar detection limit (~1 ng/ml). At the same time, the ref-OECT-based E-AB sensor showed enhancement in sensitivity (2.90 mS/dec vs. 0.51 mS/dec) compared to the conv-OECT-based E-AB sensor. This approach is broadly applicable to a wide range of tethered redox-reporter-based electrochemical sensors with various electrochemical interrogation methods to enhance sensitivity and improve device form factor and integration.

Results

Design Concept of Ref-OECT-Based E-AB Sensor

Figure 6:
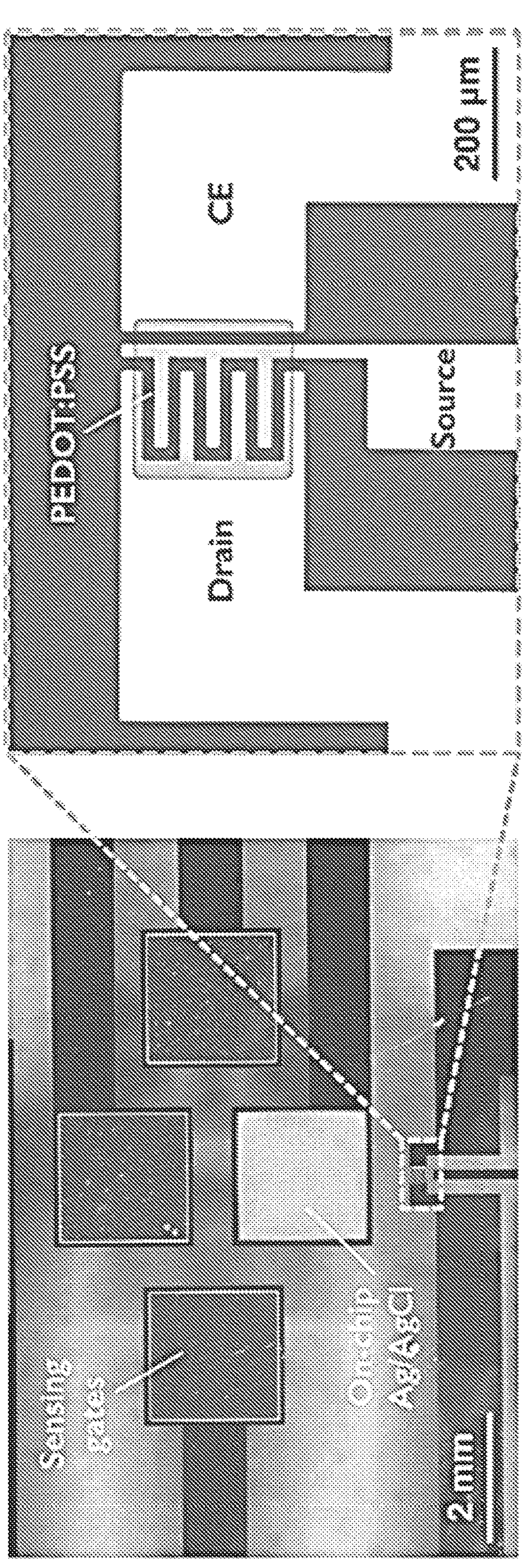
FIG. 6 shows a microscope image of the integrated ref-OECT-based E-AB sensor with 3 working electrodes (sensing gates), an on-chip Ag/AgCl reference electrode, and a PEDOT:PSS counter electrode (channel) with interdigitated drain and source electrodes integrated together.
Figures 7A, 7B, 7C, 7D, 7E, 7F:
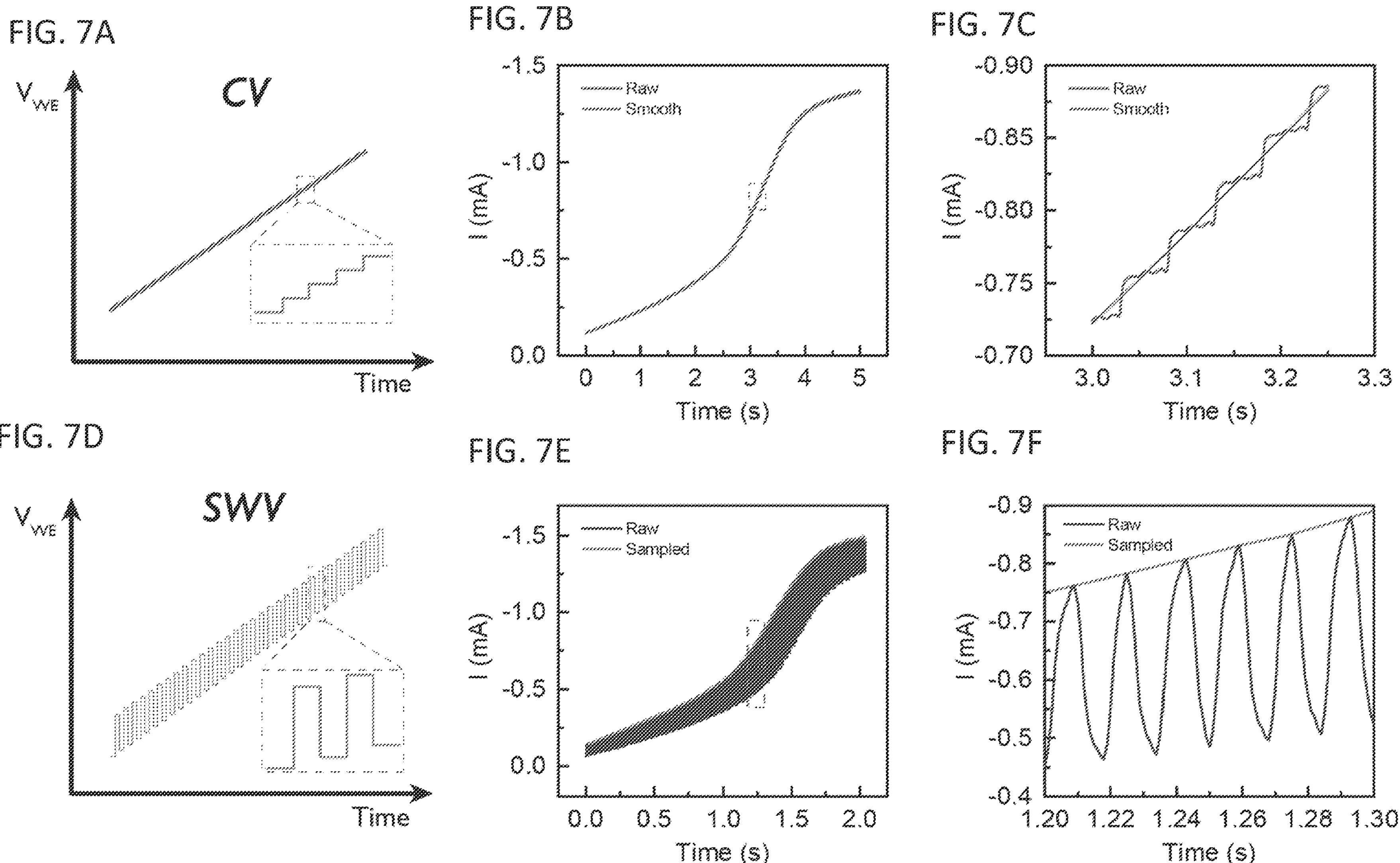
FIGS. 7A-7F show voltage waveforms and the current sampling strategy during ref-OECT-based E-AB sensor operation.
Figures 8A, 8B, 8C, 8D, 8E, 8F:
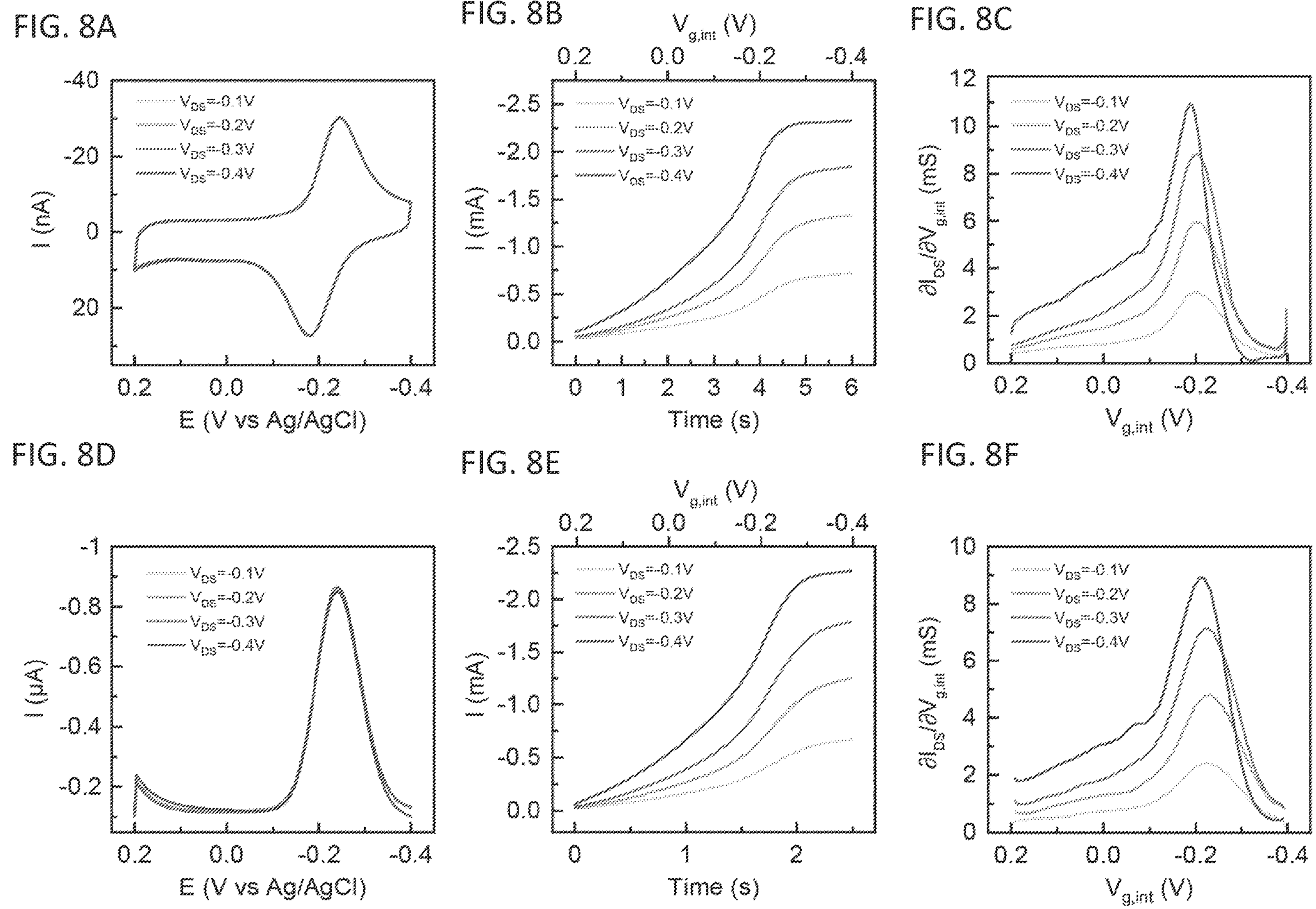
FIGS. 8A-8F show the influence of $V_{DS}$ on device performance.
Figures 9A, 9B, 9C, 9D, 9E:
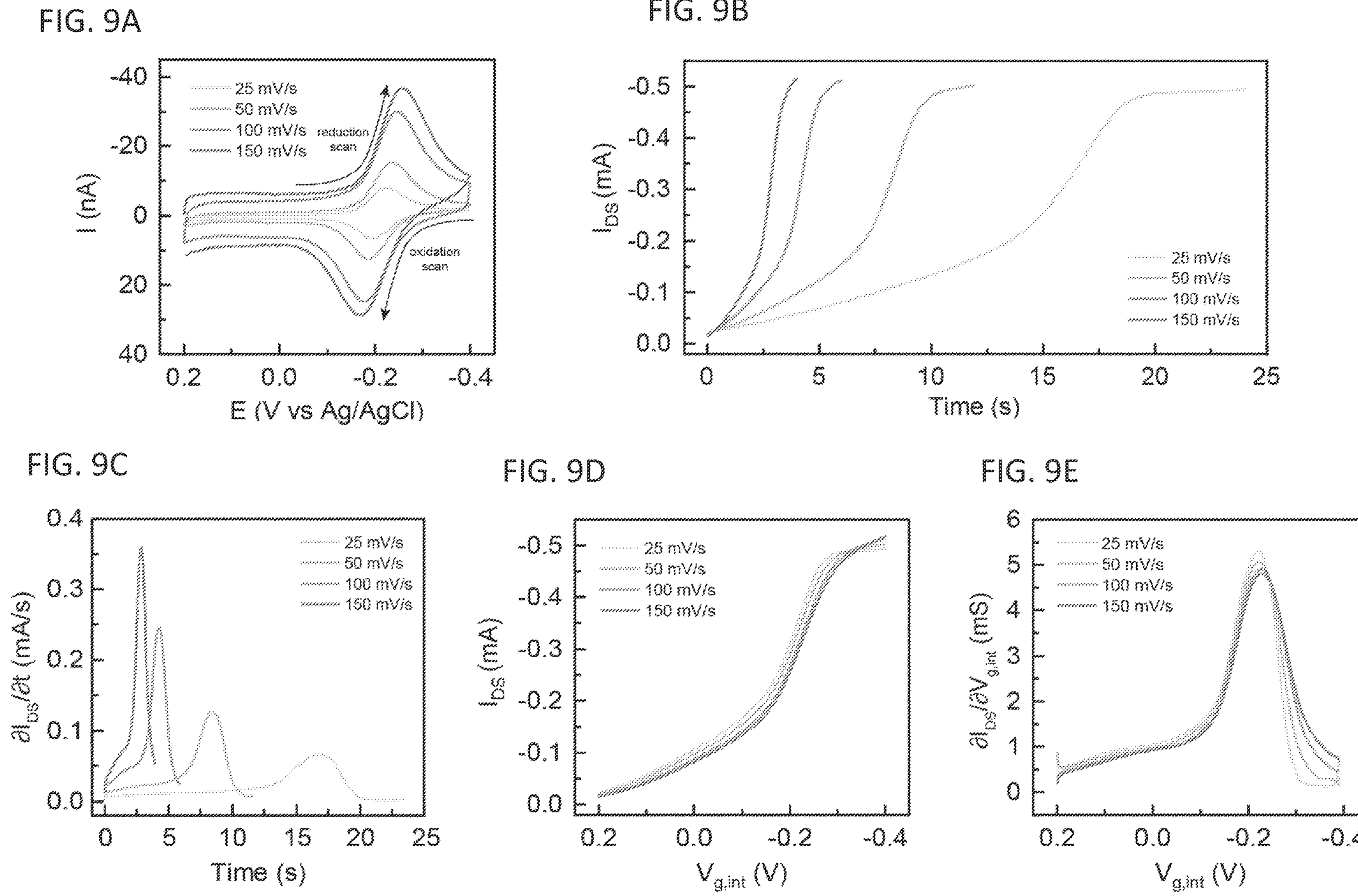
FIGS. 9A-9E show the influence of scan rate on device operation.

The schematic of the ref-OECT-based E-AB sensor and the testing scheme are shown in FIGS. 1B-1C. The device is composed of three aptamer-modified Au electrodes, one Ag/AgCl electrode and one PEDOT:PSS electrode, which were monolithically integrated using multiple photolithography, vapor phase deposition, and etching process. From the point of view of E-AB sensor, the Au, Ag/AgCl, and PEDOT:PSS electrodes are regarded as the working, reference, and counter electrodes, respectively. In this design, established and accepted electrochemical measurements like CV and SWV can be conducted in the E-AB sensor. From the perspective of the OECT, the Au and PEDOT:PSS can be considered as the gate and channel respectively, and Ag/AgCl serves as a reference point to set the precise voltage drop at the gate/electrolyte interface. The interdigitated drain and source electrodes were patterned underneath the PEDOT:PSS channel which defined a large W/L to boost the channel current modulation, while another Au electrode beside the drain and source electrodes served as the connection lead for the counter electrode, as shown in the enlarged view in FIG. 1A. FIG. 6 shows the microscope image of the ref-OECT-based E-AB sensor where the Au sensing gates and the on-chip Ag/AgCl reference electrode were both 2 mm×2 mm. The PEDOT:PSS counter electrode was 240 μm×240 μm with a channel width of 1080 μm and a channel length of 20 μm. During the operation of the ref-OECT-based E-AB sensor, the traditional electrochemical measurement was conducted in the E-AB sensor with the above-mentioned 3-electrode setup, while the change of in-plane conductivity in PEDOT:PSS can be monitored at the same time by the drain and source electrodes and regarded as the output of the OECT device. Since the characterization of the working electrode was performed in a standard 3-electrode setup, the electrochemistry that happened on the working electrode can be retained with respect to the analysis of an electrode-based E-AB sensor despite the integration with an OECT. Considering the circuit from the modified Au working electrode to the PEDOT:PSS counter electrode, the current and total charge (time integral of current) passing through the working electrode was equal to that in the counter electrode. In this regard, the PEDOT:PSS counter electrode served as a capacitively coupled electrode whose conductivity can be modulated by the doping/de-doping of the channel active materials resulting from ion injection/extraction, which was driven by the current from the working electrode. Since the change of the conductivity in the PEDOT:PSS counter electrode led to variation of channel current in the OECT, the output of the OECT can be directly related to the current in the working electrode in the E-AB sensor (also considered as gate current $I_G$ from the perspective of the OECT).

To demonstrate the sensing mechanism of the ref-OECT-based E-AB sensor, the sensing of TGF-$\beta_1$ was taken as an example, as shown in FIG. 1C. E-AB sensors for TGF-$\beta_1$ have been demonstrated previously as a "signal-off" type of sensor. (Matharu, Z. et al. *Anal. Chem.* 86, 8865-8872 (2014); Zhou, Q. et al. *Lab on a Chip* 15, 4467-4478 (2015).) In brief, in the absence of TGF-$\beta_1$, the aptamer was in a conformation where a methylene blue (MB) redox reporter was close to the Au surface, which resulted in a high current in the working electrode (high $I_G$) during CV or SWV measurement. The high $I_G$ will lead to an elevated ion injection into the PEDOT:PSS counter electrode, which extensively alters the doping level of the PEDOT:PSS, inducing a larger channel current modulation recorded by drain/source electrodes. On the other hand, in the presence of TGF-$\beta_1$, the binding between the aptamer and the TGF-$\beta_1$ caused a conformational change of the aptamer and thus moved the redox-active MB away from the electrode surface, which resulted in a lower current in the working electrode (low $I_G$). This low $I_G$ will lead to less ion injection into the PEDOT:PSS and hence a smaller channel current modulation. In this case, the degree of channel current modulation can be regarded as an indicator of the TGF-$\beta_1$ concentration in the ref-OECT-based E-AB sensor.

Characterization of Individual Components in Ref-OECT-Based E-AB Sensor

To illustrate the proposed operation and sensing mechanism of the ref-OECT-based E-AB sensor, the aptamer functionalization was first characterized on the Au electrode, which was a critical step for sensing selectivity and the foundation of the device. The detailed aptamer functionalization process is described in the methods section. X-ray Photoelectron Spectroscopy (XPS) of the aptamer-modified Au electrodes showed distinct S 2p and N Is peaks originating from the backbone of the aptamer, which indicated the presence of aptamer on the surface of the Au electrode.

Furthermore, electrochemical impedance spectroscopy (EIS) on the Au electrode before and after aptamer modification and mercaptohexanol (MCH) backfill showed that the impedance of the Au electrode increased after aptamer modification and MCH backfill over a large frequency range. By fitting the EIS results using Randles circuit, the double layer capacitance on the Au electrode decreased from ~14.1 $\mu F/cm^2$ to ~8.4 $\mu F/cm^2$ after aptamer modification and further to ~1.7 $\mu F/cm^2$ after MCH backfill. The EIS results further confirmed the successful attachment of aptamer and MCH on the Au electrode. Last, electrochemical quartz crystal microbalance with dissipation (EQCM-D) was used to monitor the equivalent functionalization process via mass and electrochemical signal change of the Au-coated quartz crystal microbalance (QCM) sensor. A large mass increase together with a growing redox peak due to MB (attached on the 5' end of aptamer) in stage 1 indicated the bonding and non-covalent absorption process of aptamer on the Au surface. The subsequent mass decrease as well as diminishing of the redox peak in the rising step in stage 2 suggested the removal of the non-bonded aptamer. Next, mass increases again in stage 3, owing to the attachment of MCH, and background signal in SWV results decreased due to MCH's ability to insulate the void areas of the Au electrode. Finally, the last rinsing step partially removed loosely bound MCH. Combining the results from XPS, EIS, and EQCM-D, the successful aptamer functionalization on the Au electrode can be confirmed. By using this established aptamer modification protocol, the aptamer-modified Au electrode exhibited stable electrochemical behavior indicated by the consistent SWV results over 30 scans. (Matharu, Z. et al. 2014.)

One advantage of the ref-OECT-based E-AB sensor is the monolithic integration of various components in a thin film form-factor, which eliminates the use of bulky reference/counter electrodes and enables miniaturization and system integration. Functionality of the on-chip Ag/AgCl electrode and PEDOT:PSS counter electrode was verified before operating the ref-OECT-based E-AB sensor. EIS of an Au electrode was conducted using either bulky Ag/AgCl pellet or on-chip Ag/AgCl as the reference electrode, which showed similar results. Then by using on-chip Ag/AgCl as the reference electrode, SWV of the aptamer modified Au was also performed with either bulky Pt mesh or thin film PEDOT:PSS as the counter electrode. Comparable results were obtained, which confirmed the applicability of PEDOT:PSS as the counter electrode.

Influence of Experimental Parameters on the Electrical Behavior of Ref-OECT-Based E-AB Sensor With the aptamer-modified Au electrode, functional on-chip Ag/AgCl reference electrode, and PEDOT:PSS counter electrode, the operation of the ref-OECT-based E-AB sensor can be demonstrated. First, the effect of various parameters on the behavior of the ref-OECT-based E-AB sensor was investigated. The detailed voltage waveform and the sampling strategy of the current are schematically shown in FIGS. 7A-7F. The ref-OECT-based E-AB sensor was first tested by measuring channel current with different $V_{DS}$ while CV/SWV was conducted on the working electrode. As shown in FIGS. 8A-8F, the current in the working electrode remained constant, as expected, in both CV and SWV regardless of the Vos used, while both the channel current and the peak slope of channel current increased with larger $V_{DS}$, indicating that higher signal could be detected at higher $V_{DS}$. Next, the effect of the scan speed, a crucial parameter for a CV experiment, on the behavior of the ref-OECT-based E-AB sensor was investigated and the results are shown in FIGS. 9A-9E. As expected, for the CV results in the electrode-based sensor, both the amplitude and the separation of oxidation and reduction peaks for MB increased with faster scan rate. For the OECT, the original channel current was recorded as a function of time (only the channel current during reduction scan of the MB redox reporter is shown here), and when the channel current was plotted vs. time, quicker change of channel current as well as higher peak slope could be observed with faster scan speed as expected. When converting the time to voltage by dividing the scan speed and plotting the channel current vs. $V_{g,int}$, the scan rate of CV did not influence the channel current or the slope of channel current too much. The peak position of the slope of channel current showed similar negative shift as that for the reduction peak of the electrode. In addition, the stability of the ref-OECT-based E-AB sensor was evaluated during continuous operation as shown in FIGS. 3A-3D. The CV results clearly showed 4 overlapped reduction peaks of MB in the forward scan and the oxidation peaks of MB in the reverse scan in FIG. 3A. As for the OECT measurement in FIG. 3B, the reversible modulation of the channel current can be observed during the forward and reverse scan of the CV. More importantly, the sudden change of slope in channel current modulation can be observed during both reduction/oxidation processes of MB in the working electrode in 4 CV cycles, which confirmed the stable operation of the ref-OECT-based E-AB sensor. In a similar manner to CV, the SWV and OECT results in FIGS. 3C and 3D also show the conversion of the redox peak into the slope change of the channel current modulation. The similar channel current modulation during 9 SWV scans also indicated the stability of the ref-OECT-based E-AB sensor.

Comparison Between Ref-OECT and Conv-OECT-Based E-AB Sensor

Figure 4A:
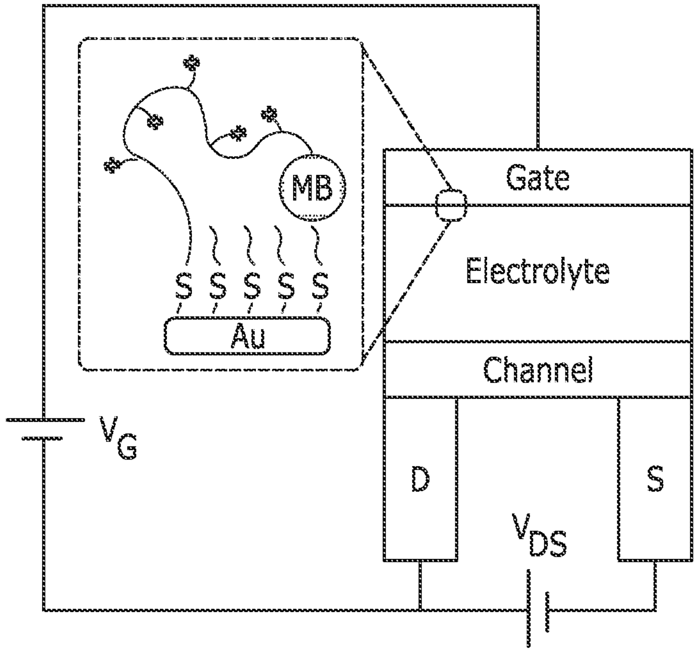
FIGS. 4A-4C show a conv-OECT vs. a ref-OECT-based E-AB sensor.
Figure 4B:
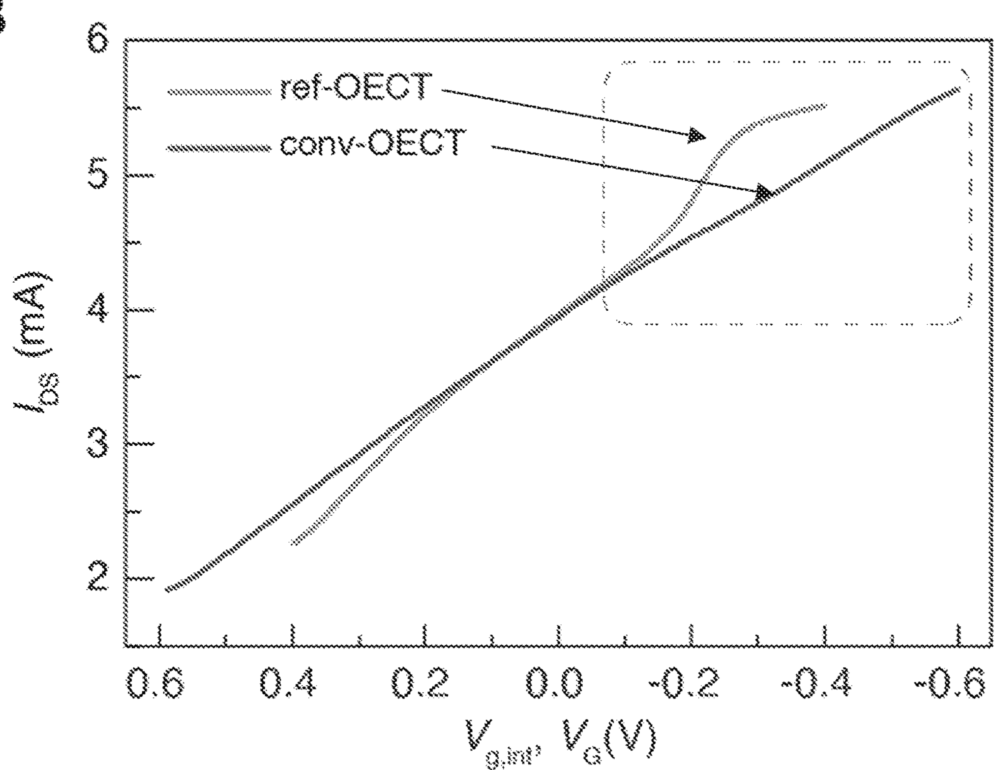
Figure 4C:
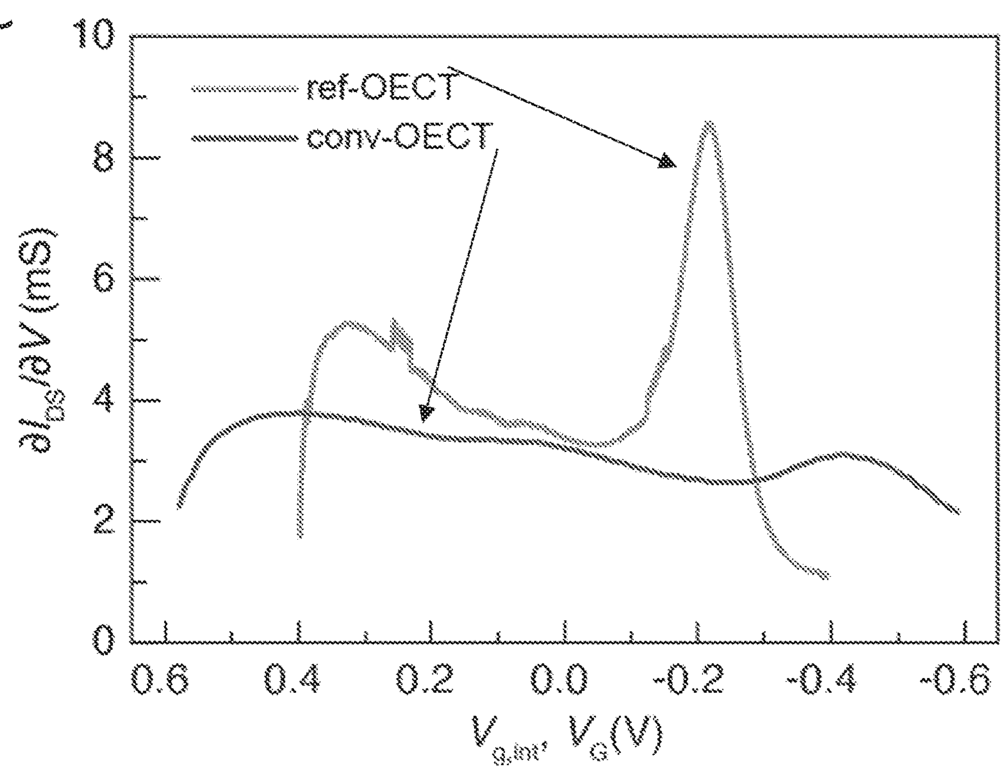

The ref-OECT-based E-AB sensor for TGF-$\beta_1$ sensing was compared to a conv-OECT-based E-AB sensor (FIG. 4A), which is routinely reported in the literature. Since the most important difference between those two devices (ref-OECT vs. conv-OECT) is the testing method for the working electrode (gate) in the ionic circuit (an independent reference electrode has been used in the ref-OECT), the aptamer-modified Au working electrode was first characterized in a standard three-electrode setup (3E, on-chip Ag/AgCl electrode as reference electrode and PEDOT:PSS channel as counter electrode) and two-electrode setup (2E, PEDOT:PSS channel as both reference and counter electrodes). The Au working electrode was exactly the same in these two setups. The results showed that the redox peak current in the 2E setup was much lower than that of the 3E setup in both CV and SWV. This phenomenon is likely because the evolution of the potential at the working electrode/electrolyte interface was not rigorously controlled in the 2E setup. This allowed potential pinning due to the redox reaction which subsequentially broadened and flattened the peak (when plotted against simple applied voltage across the entire device), but the total charge associated with the redox process was roughly equivalent in both 3E and 2E setups. Because the modulation of this peak height by aptamer-target binding was the main mechanism for the sensing, it follows that the ref-OECT-based E-AB sensor should provide better sensitivity than the conv-OECT-based E-AB sensor. To demonstrate this, OECT channel current in both the ref-OECT and the conv-OECT-based E-AB sensor with the exact same working electrode (gate of OECT) were measured as shown in FIG. 4B. The conv-OECT-based E-AB sensor operated in a traditional manner where the transfer curve was obtained by scanning the gate voltage ($V_G$) and recording the channel current ($I_{DS}$). For the ref- OECT-based E-AB sensor, CV (only forward scan here) was conducted in the working electrode (gate) in the 3E setup and the channel current was monitored, while simultaneously acting as the counter electrode. Accordingly, the slope of the channel current showed a sudden increase in the ref-OECT-based E-AB sensor at the potential associated with the MB charge transfer, while this sudden slope change was significantly diminished in the conv-OECT-based E-AB sensor even at a wider scan range. (FIG. 4B). By plotting the derivative of current vs. voltage (slope), it is clear that the peak of the slope was much lower in the conv-OECT than the ref-OECT-based E-AB sensor (FIG. 4C). This is direct evidence that the redox peak information of MB, which is related to the analyte sensing, can be more effectively converted into the channel current modulation in the ref-OECT than in the conv-OECT-based E-AB sensor. Notably, while the configuration used in FIG. 1B is helpful for explaining the mechanism, it should be noted that it is also possible to further simplify the structure of the ref-OECT-based E-AB sensor by combining the S and CE contacts.

TGF-$\beta_1$ Sensing with Different Devices

Figure 5B:
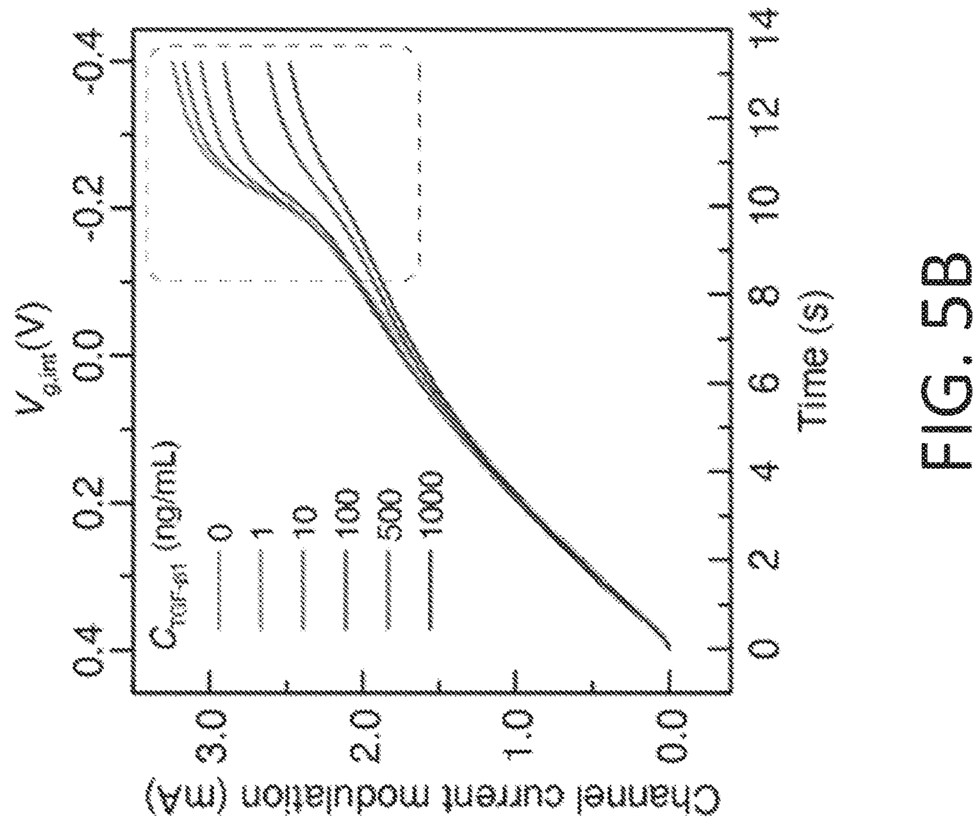
FIGS. 5A-5F show TGF-$\beta_1$ sensing.
Figure 5A:
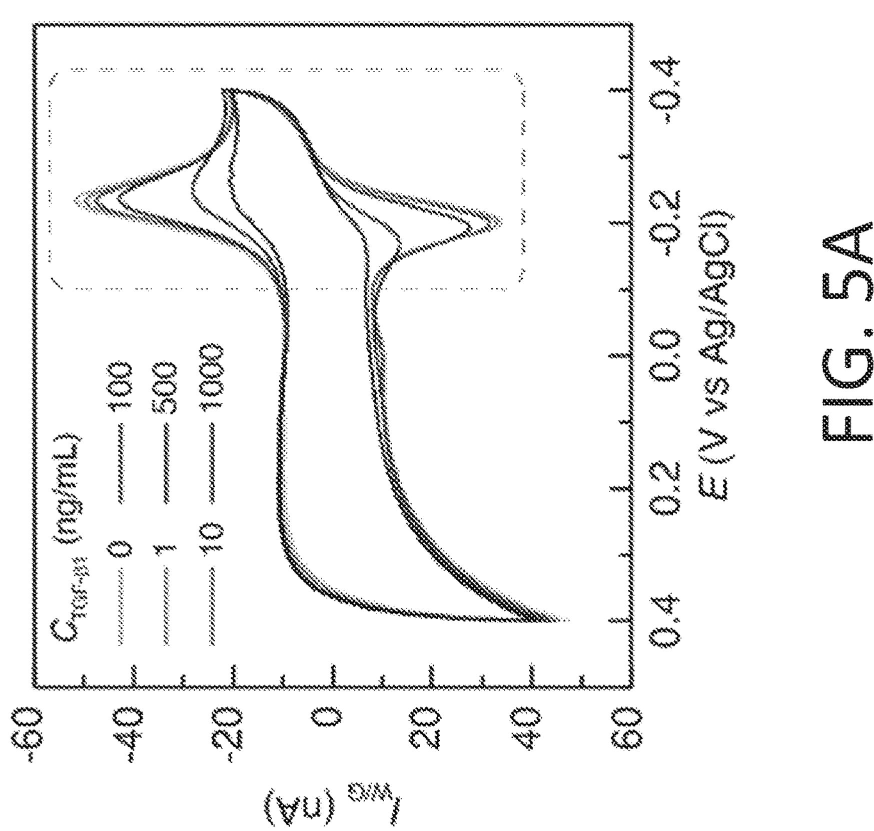
Figure 5D:
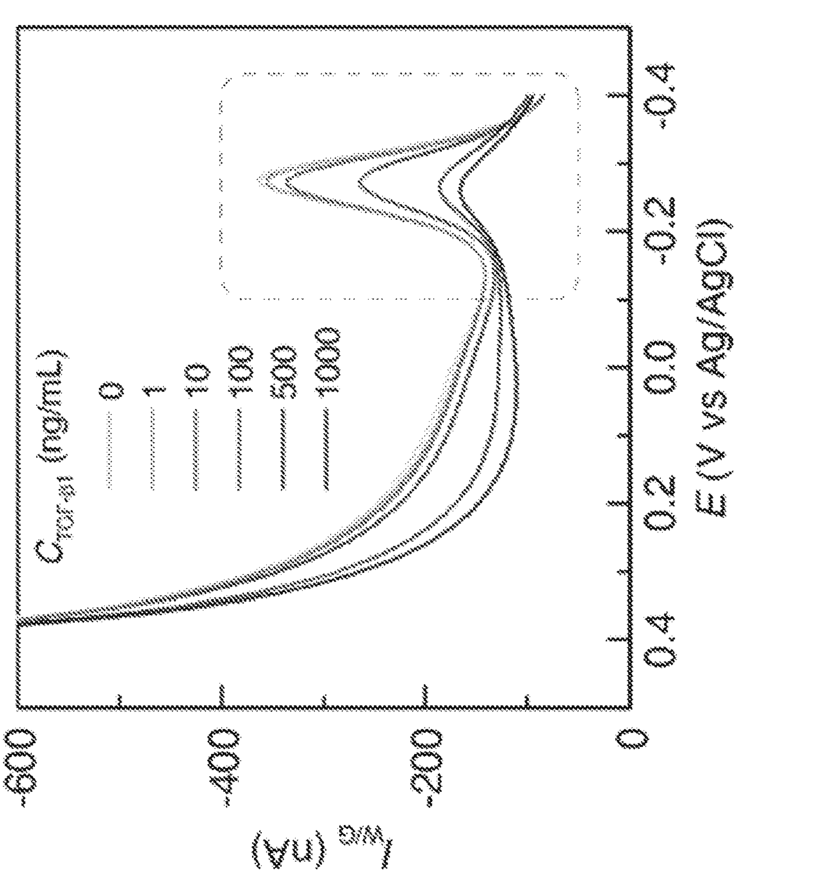
Figure 5C:
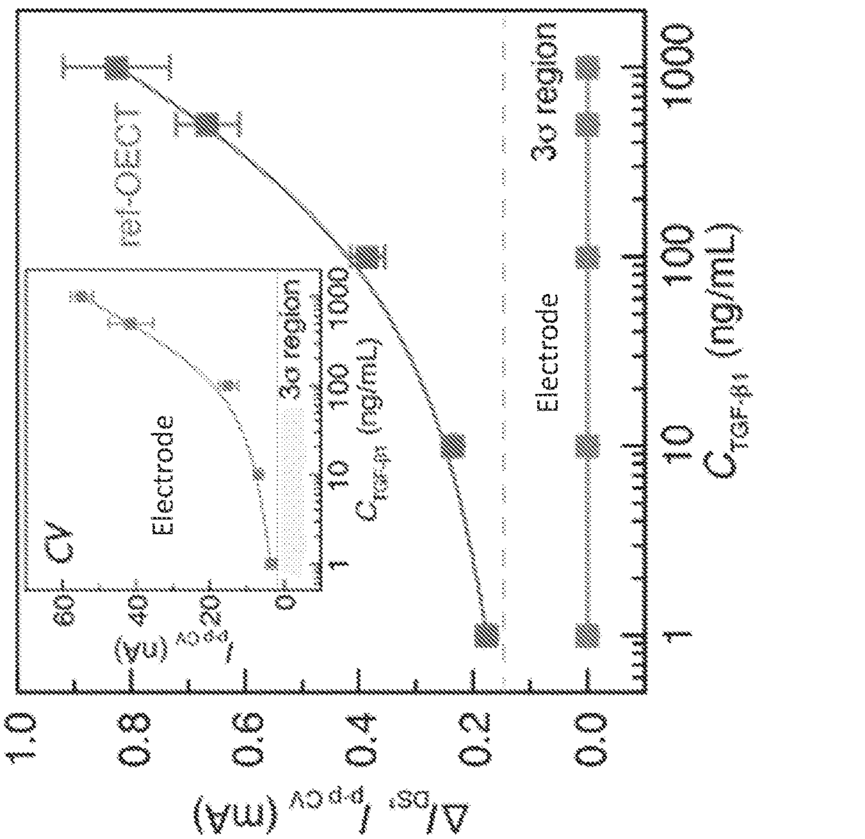
Figure 5F:
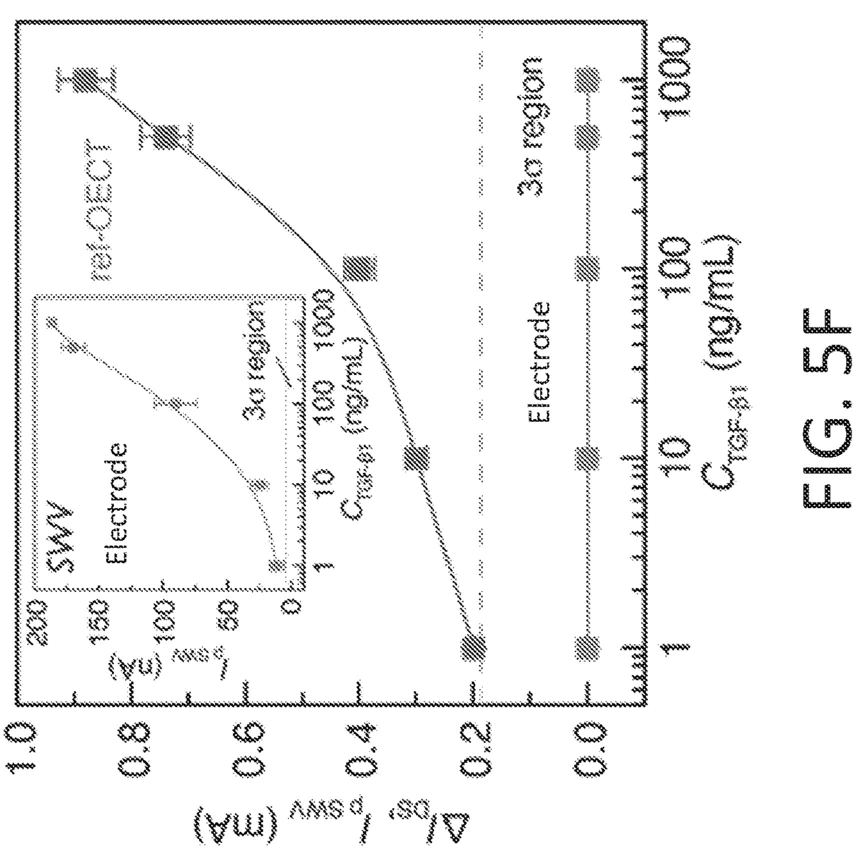
Figure 5E:
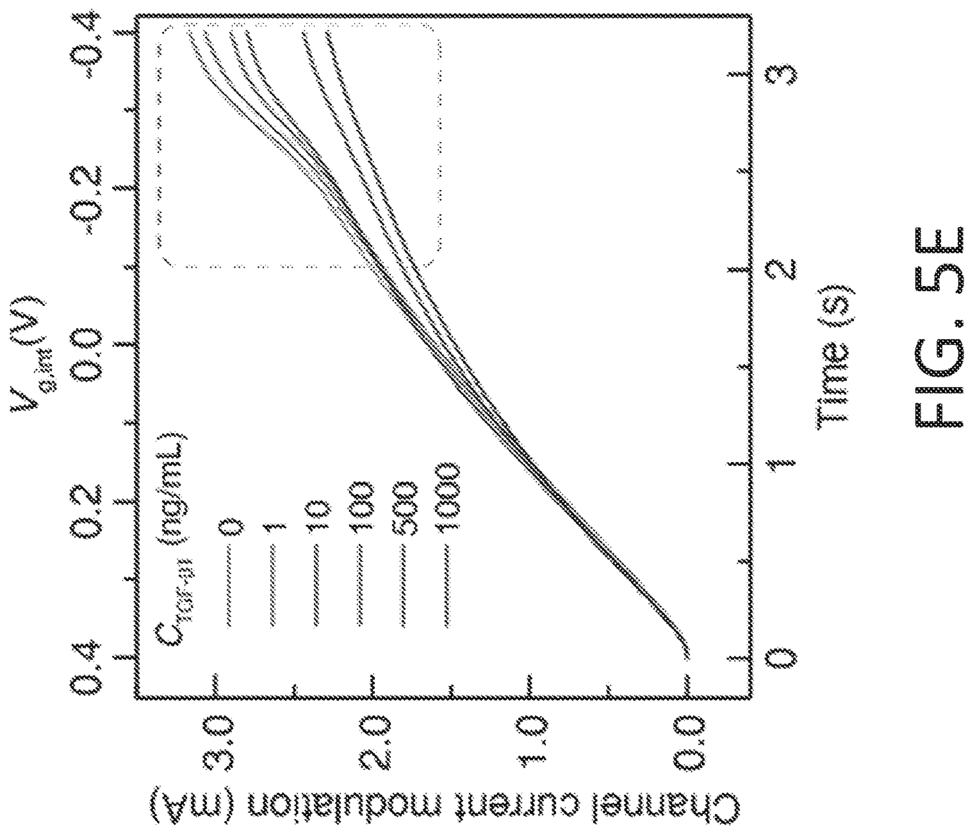

Next, the improvement in the sensing ability of the ref-OECT-based E-AB sensors compared to the electrode-only E-AB sensor was demonstrated. TGF-$\beta_1$ with different concentrations was added into the electrolyte, and the CV and SWV of the E-AB sensor as well as the corresponding OECT channel current modulation (ref-OECT) were recorded at the same time (FIGS. 5A-5F). FIGS. 5A and 5D clearly show that the increased concentration of TGF-$\beta_1$ resulted in a decrease of the redox peak in both CV and SWV, which is coherent with the fact that the binding between aptamer and TGF-$\beta_1$ brings the MB away from the electrode surface and decreases the electron transfer rate. As expected, the decreased redox current in CV and SWV due to the TGF-$\beta_1$ also resulted in a smaller channel current modulation of the ref-OECT-based E-AB sensor as shown in FIGS. 5B and 5E. Calibration curves can be established when the TGF-$\beta_1$ concentration is correlated with the redox current in CV (peak-to-peak current)/SWV (peak current) and the channel current modulation in OECT, as shown in FIGS. 5C and 5F. When comparing the sensitivity of the electrode-based E-AB sensor and the ref-OECT-based E-AB sensor for TGF-$\beta_1$ sensing, the ref-OECT-based E-AB sensor showed a ~12000-fold enhancement in sensitivity (290 μA/dec) over the CV sensing (24 nA/dec) and ~3500-fold enhancement in sensitivity (292 μA/dec) over the SWV sensing (84 nA/dec) in the electrode-based E-AB sensor. In order to demonstrate that the decrease of channel current modulation was indeed caused by the binding between the TGF-$\beta_1$ and the aptamer rather than the degradation of the PEDOT:PSS channel, the stability of the PEDOT:PSS channel was also verified during the TGF-$\beta_1$ sensing process. Standard OECT measurement was performed every time after introducing the TGF-$\beta_1$ with a new concentration by using an on-chip Ag/AgCl electrode as the gate. The transfer curves overlapped well with negligible drift, which confirmed the stability of the PEDOT:PSS channel and further proved that the decrease of channel current modulation in the ref-OECT-based E-AB sensor during TGF-$\beta_1$ sensing was indeed caused by the target binding. the sensing results from the conv-OECT and the ref-OECT-based E-AB sensor were also compared. For the conv-OECT-based E-AB sensor, transfer curves were measured as shown in FIG. 4A. The calibration curves of the sensors were obtained by plotting the change of the peak height of slope for the channel current as a function of TGF-$\beta_1$ concentration. By comparing the calibration curves between the conv-OECT and the ref-OECT-based E-AB sensors, it was shown that the ref-OECT-based E-AB sensor had a sensitivity around 2.90 mS/dec, which is about 6 times larger than that in the conv-OECT-based E-AB sensor (0.51 mS/dec). The enhanced sensing ability of the ref-OECT-based E-AB sensor over the conv-OECT-based E-AB sensor indicated that the device (the ref-OECT-based E-AB sensor) fully utilizing the property of the redox reporter had better performance. Finally, the selectivity against relevant protein interference of the ref-OECT-based E-AB sensor was characterized and the aptamer-analyte binding process was also confirmed by EQCM-D.

Discussion

One advantage of the ref-OECT-based E-AB sensor is the decoupling of sensing and amplification. The working electrode for sensing operates in an ideal 3-electrode setup and obeys the original sensing mechanism of an electrode-based sensor, while the mixed-conducting counter electrode/channel is purely used to amplify the current signal from the working electrode. In this situation, the platform was not only useful for transitioning E-AB sensors to OECT-based sensors but was also compatible with other electrode-based sensors with various electrochemical interrogation techniques, where the current in the working electrode is used as an indicator for sensing.

Typical OECT-based sensors work in a potential-driven mode where the gate voltage is kept as a constant value or scanned in a range and the channel current is monitored, while gate current is not analyzed as critically. However, in electrochemical sensing, what really matters is the voltage that has been applied at the gate/electrolyte interface, which drives the electrochemical reaction. However, this voltage at the gate/electrolyte interface is usually unknown in conv-OECT-based sensors. In a ref-OECT-based E-AB sensor, the introduction of an additional Ag/AgCl electrode serves as an indicator and helps to control the potential drop at the gate/electrolyte interface where the reaction occurs, while the real voltage applied at the channel from the gate is unknown. However, because of the current continuity from working to counter electrode, the gate current is known during the measurement and can modulate the channel current according to the following equation:

$$\Delta I_{DS} = \frac{\mu V_{DS}}{L^2} \int I_G dt \tag{1}$$

where $\Delta I_{DS}$ is the channel current modulation, L is the channel length, μ is the hole mobility of the mixed conductor, and $V_{DS}$ is the drain/source voltage. The integral of $I_G$ stands for the number of injected ions into the mixed conductor that modulates the carrier concentration during operation. In this scenario, the ref-OECT-based E-AB sensor is a current-driven OECT where the detection of the targets will influence $I_G$ and its integral, hence the channel current modulation. Operation of the OECT in galvanostatic mode with constant gate current further supports the claim that the modulation of channel current scales linearly with the amount of injected charge (Q) in the region of operation of interest. The functionality of equation 1 also helps to explain the observed signals in FIGS. 4A-4C and 5A-5F. Specifically, the electrode E-AB sensor measured by the CV and SWV shows the redox peaks associated with the current in the working electrode, equivalent to $I_G$ in the transistor. The transduced signal via the OECT then takes on the functionality of the integral of $I_G$ modified by an amplification factor of $$\frac{\mu V_{DS}}{L^2}.$$

Although the integral of $I_G$ is not used to characterize the electrode E-AB sensor, it is positively correlated with the redox current in CV (peak-to-peak current)/SWV (peak current). As a result, the amplification factor can still be optimized according to equation 1. This equation describes the amplification properties of an OECT to the integral of $I_G$. The equation also shows that the amplification factor is highly related to the materials' figure-of-merit and the geometry, which indicates that the amplification factor can be further enhanced by using organic mixed ionic-electronic conductors (OMIECs) active channel with higher mobility and designing the channel with short length. Although volumetric capacitance (C*), another important parameter of OMIECs, is not explicitly shown in equation 1, it is still relevant for the sensor design. When a channel with low volume is used for the purpose of miniaturization, a larger C* is necessary to maintain the charge injection capacity of the channel, hence its functionality as a counter electrode. In addition, channel material design rules of the ref-OECT-based E-AB sensor are such that the operation region of the OECT must be matched with the redox potential of the redox reporter, among other considerations. For example, an accumulation mode OECT with a p-type channel can work with a MB redox reporter while accumulation mode OECTs with n-type channels are compatible with ferrocene redox reporters.

Finally, one advantage of the OECT-based sensor is the removal of the reference electrode that enables simplicity. In the ref-OECT-based E-AB sensor, although the reference electrode was retained, the thin film form-factor and the monolithic integration enabled minimal added burden in the device design, which still resulted in a sensor with minimal size, integration flexibility, and ease of operation. More importantly, multiple sensing gates that target different analytes with shared Ag/AgCl reference electrode and PEDOT:PSS counter electrode/channel can be fabricated, which could lead to multiplexed sensing and amplification on-site.

In summary, this Example successfully demonstrates the fabrication and utilization of a ref-OECT-based E-AB sensor that shows 3~4 orders of magnitude enhancement in sensitivity for TGF-$\beta_1$ sensing compared to a bare electrode-based E-AB sensor and improvement in sensitivity compared to a conv-OECT-based E-AB sensor. Monolithic integration of an aptamer-modified Au working electrode, an on-chip Ag/AgCl reference electrode, and a PEDOT:PSS counter electrode enabled the compact design of the device that has great potential for high density sensing arrays. A new device testing scheme helped to decouple the sensing from the E-AB sensor and amplification in the OECT, which helped to retain the key features for both the OECT and the E-AB sensor. This approach provides the functionality of both the E-AB sensor and the OECT and offers an integration strategy between electrode-based sensors with traditional electrochemical characterization methods and OECT. Direct amplification of the current in the working electrode (gate, E-AB sensor) can be achieved on-site in the OECT, reflected by the channel current modulation. This device concept and testing scheme is universal for E-AB sensors targeting other analytes, as well as other tethered redox-reporter based sensors. In addition, it also allows for the integration of previously discussed high surface area sensing electrodes and could further enhance both sensitivity and limit of detection (LOD). (Xu, H. et al. *Chem. Commun.* 48, 6390-6392 (2012); Downs, A. M. et al. *ACS sensors* 6, 2299-2306 (2021); and Li, S. et al. *RSC advances* 11, 671-677 (2021).) As such, these separate techniques are not mutually exclusive and can be integrated synergistically.

Methods

Aptamer Preparation:

TGF-$\beta_1$ aptamer was purchased from Integrated DNA Technologies (IDT) with amino modification at the 5' end and thiol modification at the 3' end. The sequence for the TGF-$\beta_1$ aptamer is shown on page 8866 of Matharu, Z. et al. 2014. The backbone of the aptamers was partially modified by a phosphorothioate bond (represented by "*" in the sequence) on the 5' end of both A and C. This modification is believed to provide enhanced nuclease resistance and higher affinity than the native phosphodiester bond. (Kang, J. et al., *Bioorg. Med. Chem. Lett.* 18, 1835-1839 (2008).) The aptamer was reconstituted at a concentration of 100 μM in IDTE buffer (pH=8.0) from the supplier. Methylene blue (MB), carboxylic acid, and succinimidyl were purchased from Biosearch Technologies. NHS-labeled MB was conjugated to the 5' end of TGF-$\beta_1$ aptamer via the succinimide ester coupling reported previously. (Zhou, Q. et al. 2015.) In short, 50 μL of 100 UM aptamer was mixed with 20 μL dimethylformamide (DMF), 10 μL 0.5 M sodium bicarbonate ($NaHCO_3$), and 0.3 mg MB. The mixture was stored at 4° C. for 4 h to modify the aptamer with MB redox reporter. 5 μL MB-modified aptamer was reduced by 10 μL 10 mM tris(2-carboxyethyl) phosphine hydrochloride (TCEP, in IDTE buffer) at room temperature (RT) for 2 h to cleave the disulfer bond in aptamer. This solution was then diluted in 1X phosphate-buffered saline (PBS) containing 1 mM $MgCl_2$ to 1 μM aptamer concentration and heated at 95° C. for 5 min to re-fold the aptamer. The aptamer solution was ready to be used for modification after cooling down at RT for 15 minutes.

Fabrication Process of Ref-OECT-Based E-AB Sensor

Figure 2B:
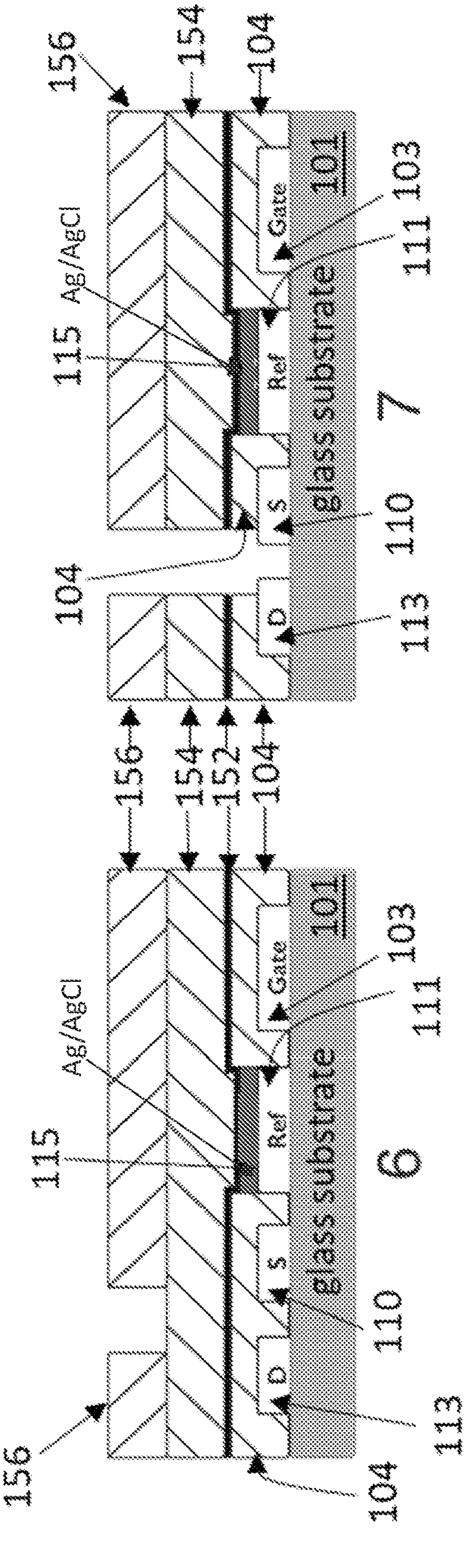
Figure 3A:
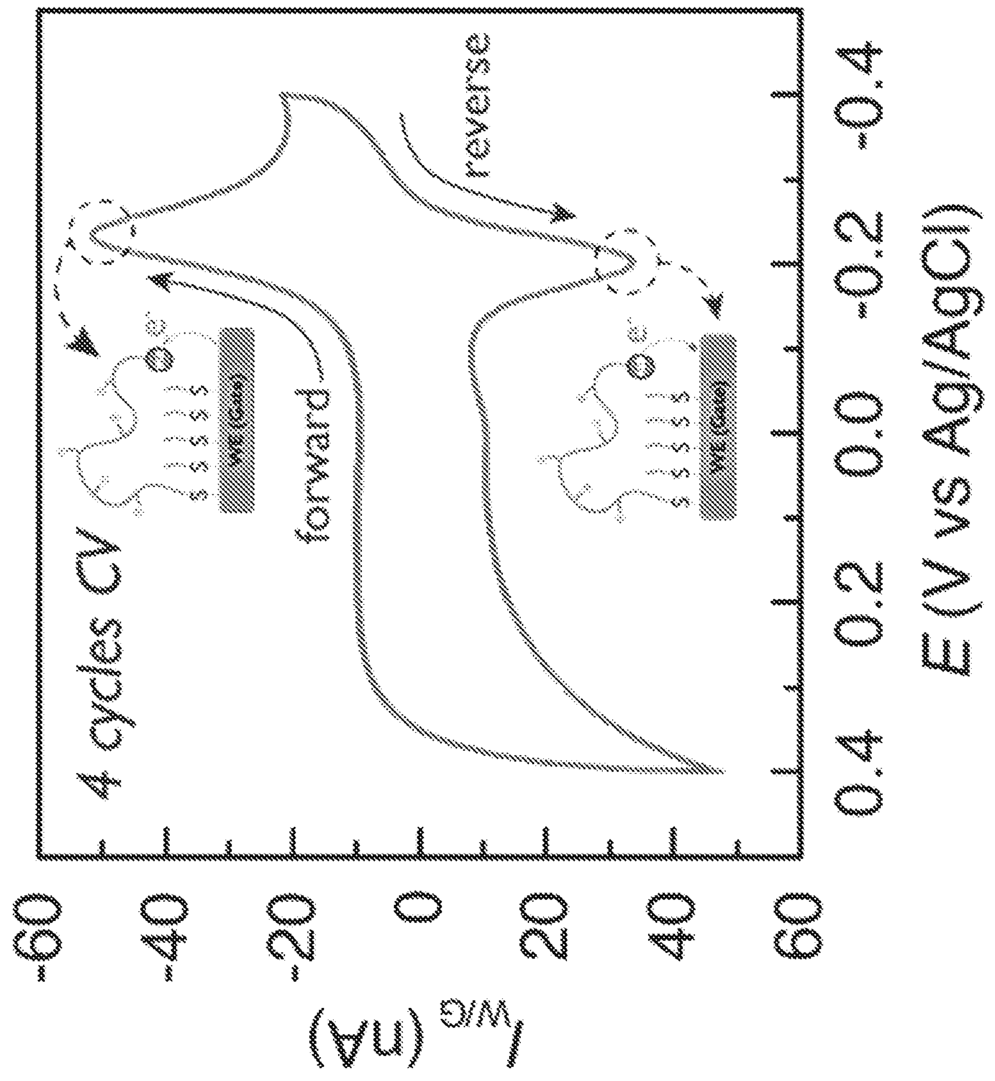
FIGS. 3A-3D show continuous operation of a ref-OECT-based E-AB sensor.
Figure 3B:
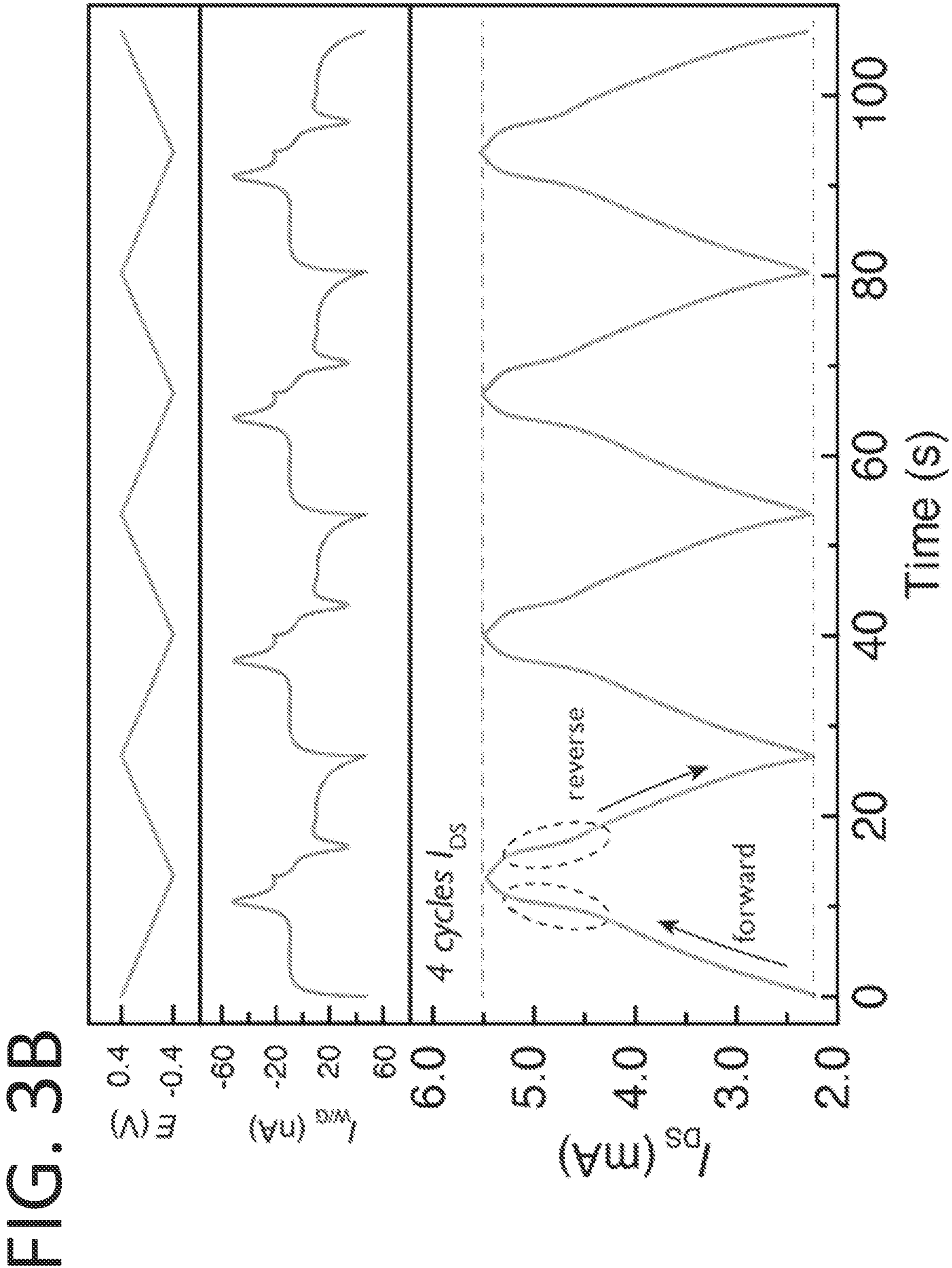
Figure 3C:
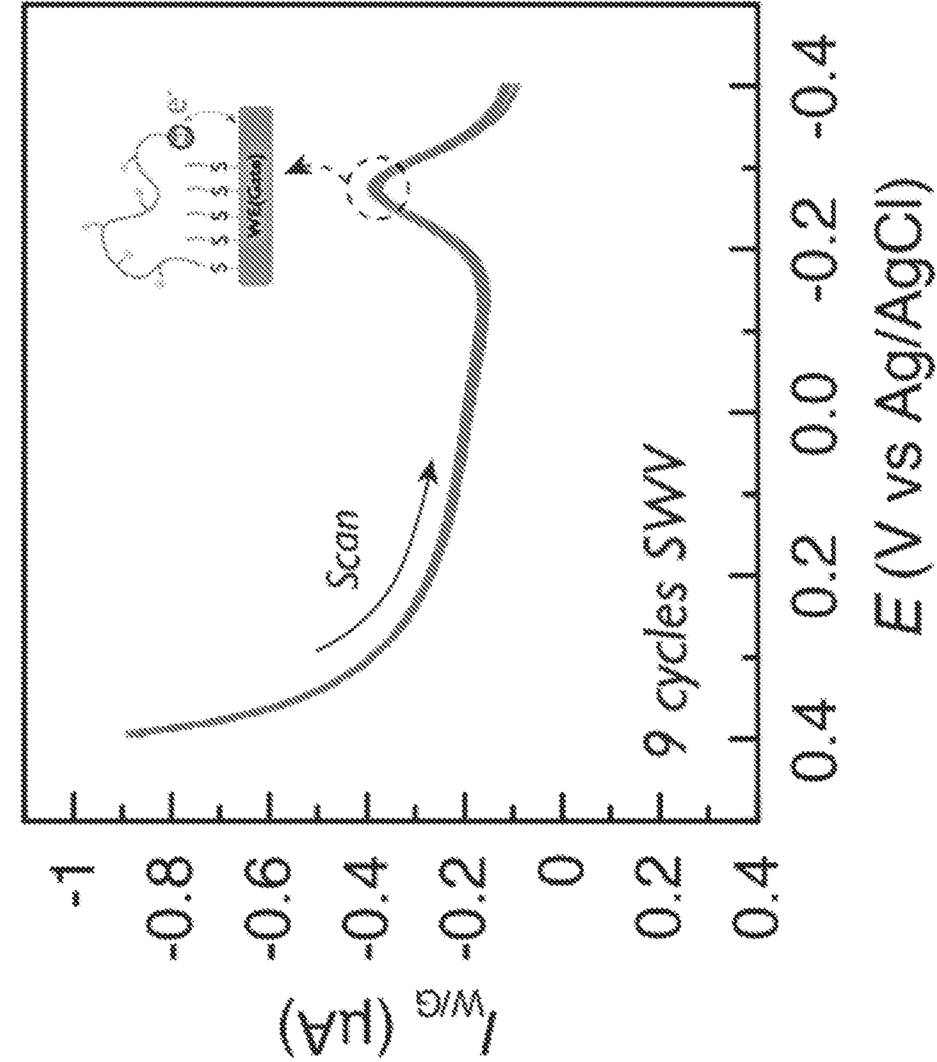
Figure 3D:
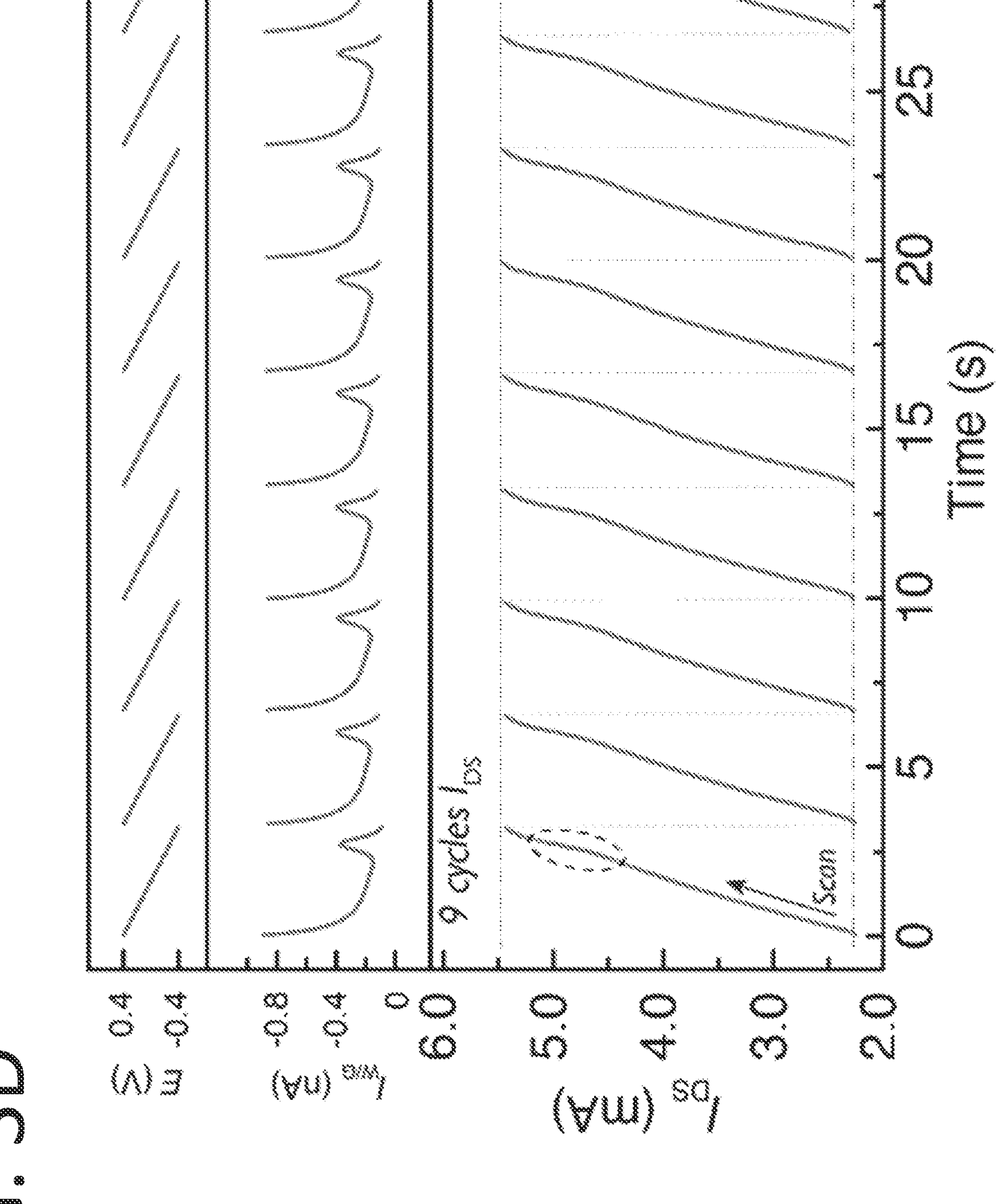

The detailed fabrication process is shown in FIGS. 2A-2C. First, Cr (5 nm)/Au (100 nm) electrodes were patterned on glass substrates by photolithography and the subsequent lift-off process of the negative photoresist (AZ nLOF 2035). After a surface treatment with the adhesion promoter Silane A-174, a 2 μm-thick parylene C was deposited on the substrate serving as an encapsulation layer. Then, a diluted micro-90 (2% v/v in deionized (DI) water) was spin-coated as an anti-adhesive layer, and subsequently, a sacrificial second parylene C layer of 2 μm was deposited. One of the Au electrodes (2 mm×2 mm) was opened through successive photolithography (AZ P4620 photoresist) and reactive ion etching steps (Samco RIE-10NR). 200 nm of Ag was deposited by e-beam evaporator (AJA) and patterned by peeling the sacrificial parylene layer. To form the on-chip Ag/AgCl reference electrode, 0.1 M $FeCl_3$ solution was dropped on the patterned Ag electrode for 1 minute to partially transfer Ag to AgCl. After the fabrication of the on-chip Ag/AgCl electrode, the PEDOT:PSS counter electrode (channel) was patterned using a similar sacrificial parylene peel-off process. After opening the exposed counter electrode area, a PEDOT:PSS blend consisting of 5 vol % ethylene glycol (EG), 1 vol % (3-glycidyloxypropyl) trimethoxysilane (GOPS), and 0.5 vol % dodecylbenzene sulfonic acid (DBSA), filtered through a 0.45 μm polytetrafluoroethylene filter, was spin-coated on the device at 2000 rpm for 1 minute. After a gentle thermal annealing at 90° C. for 2 minutes, the sacrificial parylene layer was removed to pattern the PEDOT:PSS counter electrode (channel), followed by thermal crosslinking at 140° C. for 60 min. The last step of the device fabrication was the modification of the 3 sensing electrodes using TGF-$\beta_1$ aptamer. The same sacrificial parylene deposition and etching process was performed to open the 3 Au working electrodes, while keeping the other part in the device encapsulated to avoid the influence of aptamer on the other components of the device. The device was then immersed in the prepared aptamer solution for 18 h at 4° C. After rinsing the unbonded aptamer with DI water, the device was then incubated in 2 mM mercaptohexanol (MCH) solution (in 1×PBS with 1 mM $MgCl_2$) for 3 h at RT. The device was ready to use after rinsing with DI water and peeling off the sacrificial parylene layer.

X-Ray Photoelectron Spectroscopy (XPS)

The XPS spectrums of the aptamer modified Au electrode were taken using Thermo Scientific ESCALAB 250Xi equipped with a monochromatic KR Al X-ray source (spot size around 500 μm) in Northwestern University's Atomic and Nanoscale Characterization Experimental Center (NUANCE). A flood gun was used for charge compensation. The analysis of the spectrum was performed using the Avantage (Thermo Scientific) software.

Electrochemical Quartz Crystal Microbalance with Dissipation (EQCM-D)

EQCM-D was performed using an Ivium potentiostat connected with a QSense electrochemistry module. Three-electrode setup comprised an Ag/AgCl reference electrode, Pt counter electrode, and the EQCM chip (Quartz PRO, 5.000 MHz, 14 mm Ti/Au) as the working electrode. The mass change was modeled with the Sauerbrey equation. (Easley, A. D. et al. *J. Polym. Sci.* 60, 1090-1107 (2022).)

Electrical Characterization

All the electrochemical measurements (EIS, CV, SWV) were conducted using an Ivium potentiostat. OECT channel current was measured by a Keithley 2604B source meter with custom-made Lab VIEW programs.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or and mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A referenced-organic electrochemical transistor (OECT)-based electrochemical aptamer-based (E-AB) sensor comprising:

an E-AB sensor comprising:

- a working electrode comprising a redox-reporter-modified aptamer-functionalized electrode;
- a reference electrode connected to the working electrode;
- a counter electrode comprising a layer of a mixed ionic-electronic conductive polymer;
- a voltage source for applying a voltage to the working electrode; and
- a working-electrode-current-detector for measuring a Faradaic current in the working electrode; and an OECT comprising:

- a gate electrode comprising the redox-reporter-modified aptamer-functionalized electrode that is also the working electrode in the E-AB sensor;
- a source electrode;
- a drain electrode;
- a channel connecting the source electrode to the drain electrode, the channel comprising the layer of the mixed ionic-electronic conductive polymer that is also the counter electrode in the E-AB sensor; and
- a channel-current-detector for measuring an in-plane current in the channel between the source electrode and the drain electrode.

2. The sensor of claim 1, further comprising an electrolyte solution in which the redox-reporter-modified aptamer-functionalized electrode, the reference electrode, the layer of the mixed ionic-electronic conductive polymer, the source electrode and the drain electrode are immersed, wherein the electrolyte solution comprises an analyte that binds to the aptamer, thereby changing the conformation of the aptamer.

3. The sensor of claim 1, wherein the redox-reporter-modified aptamer-functionalized electrode, the reference electrode, the layer of the mixed ionic-electronic conductive polymer, the source electrode and the drain electrode are integrated into a same substrate.

4. The sensor of claim 3, wherein the E-AB sensor comprises one or more additional working electrodes, each additional working electrode comprising a redox-reporter-modified aptamer-functionalized electrode that is also an additional gate electrode in the OECT.

5. The sensor of claim 4, wherein different redox-reporter-modified aptamer-functionalized electrodes are functionalized with different aptamers.

6. The sensor of claim 5, wherein different redox-reporter-modified aptamer-functionalized electrodes are modified with different redox reporters.

7. The sensor of claim 4, wherein different redox-reporter-modified aptamer-functionalized electrodes are modified with different redox reporters.

8. The sensor of claim 1, wherein the E-AB sensor comprises one or more additional working electrodes, each additional working electrode comprising a redox-reporter-modified aptamer-functionalized electrode that is also an additional gate electrode in the OECT.

9. The sensor of claim 8, wherein different redox-reporter-modified aptamer-functionalized electrodes are functionalized with different aptamers.

10. The sensor of claim 8, wherein different redox-reporter-modified aptamer-functionalized electrodes are modified with different redox reporters.

11. The sensor of claim 1, wherein the redox-reporter is methylene-blue.

12. The sensor of claim 1, wherein the mixed ionic-electronic conductive polymer is poly(3,4-ethylenedioxythiophene) doped with poly(styrenesulfonate) (PEDOT:PSS).

13. The sensor of claim 1, wherein the reference electrode is an Ag/AgCl reference electrode.

14. The sensor of claim 1, wherein the redox-reporter-modified aptamer-functionalized electrode, the source electrode, and the drain electrode comprise gold.

15. A method of detecting an analyte in an electrolyte solution using a referenced-organic electrochemical transistor (OECT)-based electrochemical aptamer-based (E-AB) sensor comprising:

an E-AB sensor comprising:

a working electrode comprising a redox-reporter-modified aptamer-functionalized electrode;

a reference electrode connected to the working electrode;

a counter electrode comprising a layer of a mixed ionic-electronic conductive polymer;

a voltage source for applying a voltage to the working electrode; and a working-electrode-current-detector for measuring a Faradaic current in the working electrode; and an OECT comprising:

a gate electrode comprising the redox-reporter-modified aptamer-functionalized electrode that is also the working electrode in the E-AB sensor;

a source electrode;

a drain electrode;

a channel connecting the source electrode to the drain electrode, the channel comprising the layer of the mixed ionic-electronic conductive polymer that is also the counter electrode in the E-AB sensor; and a channel-current-detector for measuring an in-plane current in the channel between the source electrode and the drain electrode, the method comprising:

applying a time-varying potential to the working electrode;

measuring a Faradaic current in the working electrode as a function of the time-varying potential; and simultaneously measuring an in-plane current in the channel.

16. The method of claim 15, wherein cyclic voltammetry is used to apply the time-varying potential to the working electrode and to measure the Faradaic current in the working electrode as a function of the time-varying potential.

17. The method of claim 16, further comprising calculating a concentration of the analyte in the electrolyte solution by correlating the concentration of the analyte with Faradaic current in the working electrode and with the in-plane current in the channel.

18. The method of claim 15, wherein square wave voltammetry is used to apply the time-varying potential to the working electrode and to measure the Faradaic current in the working electrode as a function of the time-varying potential.

19. The method of claim 18, further comprising calculating a concentration of the analyte in the electrolyte solution by correlating the concentration of the analyte with Faradaic current in the working electrode and with the in-plane current in the channel.

20. The method of claim 15, further comprising calculating a concentration of the analyte in the electrolyte solution by correlating the concentration of the analyte with Faradaic current in the working electrode and with the in-plane current in the channel.

* * * * *